(12) United States Patent
Yao et al.

(10) Patent No.: US 11,410,411 B2
(45) Date of Patent: Aug. 9, 2022

(54) METHOD AND APPARATUS FOR RECOGNIZING DESCRIPTIVE ATTRIBUTE OF APPEARANCE FEATURE

(71) Applicant: Huawei Technologies Co., Ltd., Shenzhen (CN)

(72) Inventors: Chunfeng Yao, Beijing (CN); Bailan Feng, Beijing (CN); Defeng Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 16/577,470

(22) Filed: Sep. 20, 2019

(65) Prior Publication Data
US 2020/0012880 A1 Jan. 9, 2020

Related U.S. Application Data

(63) Continuation of application No. PCT/CN2017/077366, filed on Mar. 20, 2017.

(51) Int. Cl.
*G06V 10/00* (2022.01)
*G06V 20/10* (2022.01)
(Continued)

(52) U.S. Cl.
CPC .............. *G06V 10/50* (2022.01); *G06V 10/44* (2022.01); *G06V 20/10* (2022.01); *G06V 40/103* (2022.01)

(58) Field of Classification Search
None
See application file for complete search history.

(56) References Cited

U.S. PATENT DOCUMENTS 9,235,778 B2   1/2016 Kamiya
9,278,255 B2   3/2016 Cheng et al.
(Continued)

FOREIGN PATENT DOCUMENTS

CN   103324907 A   9/2013
CN   103390150 A   11/2013
(Continued)

OTHER PUBLICATIONS

Zhao, T., et al., "Segmentation and Tracking of Multiple Humans in Crowded Environments," IEEE Transactions on Pattern Analysis and Machineintelligence, IEEE Computer Society, USA, vol. 30, No. 7, XP011224157, Jul. 1, 2008, pp. 1198-1211.
Foreign Communication From A Counterpad Application, European Application No. 17902197.7, Extended European Search Report dated Feb. 13, 2020, 9 pages.
Machine Translation and Abstract of Chinese Publication No. CN103390150, Nov. 13, 2013, 14 pages.
(Continued)

*Primary Examiner* — Matthew C Bella
*Assistant Examiner* — Brian D Shin
(74) *Attorney, Agent, or Firm* — Conley Rose, P.C.

(57) ABSTRACT

A method and an apparatus for recognizing a descriptive attribute of an appearance feature include obtaining a location feature of an appearance feature of a target image to determine a location of a part of an object in a preset object model indicated by the appearance feature, where the location feature of the appearance feature indicates the location of the part of the object in the preset object model indicated by the appearance feature, recognizing a target region based on the location feature, where the target region includes the part of the object, performing feature analysis on the target region, recognizing a descriptive attribute of the appearance feature of the object, and determining the location feature of the appearance feature having a local attribute.

20 Claims, 6 Drawing Sheets

(51) Int. Cl.
  *G06V 10/50* (2022.01)
  *G06V 10/44* (2022.01)
  *G06V 40/10* (2022.01)

(56) References Cited

U.S. PATENT DOCUMENTS

| | | | |
|---|---|---|---|
| 9,460,613 | B1 | 10/2016 | Whiting et al. |
| 2004/0136609 | A1 | 7/2004 | Ichikawa et al. |
| 2009/0116749 | A1 | 5/2009 | Cristinacce et al. |
| 2014/0003663 | A1* | 1/2014 | Li .................... G06K 9/00241 382/103 |
| 2014/0168074 | A1 | 6/2014 | Lim et al. |
| 2015/0154229 | A1* | 6/2015 | An ..................... G06F 16/583 707/728 |

FOREIGN PATENT DOCUMENTS

| | | | |
|---|---|---|---|
| CN | 103810490 | A | 5/2014 |
| CN | 103970771 | A | 8/2014 |
| CN | 103984919 | A | 8/2014 |
| CN | 104036231 | A | 9/2014 |
| CN | 104751454 | A | 7/2015 |
| CN | 105160317 | A | 12/2015 |
| CN | 106127173 | A | 11/2016 |
| CN | 106203296 | A | 12/2016 |
| CN | 104685540 | B | 4/2017 |
| JP | 2012173761 | A | 9/2012 |
| JP | 2013156718 | A | 8/2013 |
| KR | 20090018037 | A | 2/2009 |
| KR | 20130006186 | A | 1/2013 |

OTHER PUBLICATIONS

Machine Translation and Abstract of Chinese Publication No. CN103970771, Aug. 6, 2014, 21 pages.
Machine Translation and Abstract of Chinese Publication No. CN103810490, May 21, 2014, 25 pages.
Machine Translation and Abstract of Chinese Publication No. CN104036231, Sep. 10, 2014, 37 pages.
Machine Translation and Abstract of Chinese Publication No. CN104751454, Jul. 1, 2015, 28 pages.
Machine Translation and Abstract of Chinese Publication No. CN105160317, Dec. 16, 2015, 10 pages.
Layne, R., et al.. "Chapter 5: Attributes-Based Re-identification," Person Re-Identification, 2014, 25 pages.
Li, D., et al. "Multi-attribute Learning for Pedestrian Attribute Recognition in Surveillance Scenarios," 3rd IAPR Asian Conference on Pattern Recognition, 2015, pp. 111-115.
Gupta, A., et al. "Pedestrian Attribute Detection using CNN," Mar. 2016, 8 pages.
Deng, Y., et al. "Pedestrian Attribute Recognition At Far Distance," MM'14, Nov. 3-7, 2014, Orlando, Florida, USA, 4 pages.
Girshick, R., et al. "Rich feature hierarchies for accurate object detection and semantic segmentation. Tech report (v5)," Oct. 22, 2014, 21 pages.
Foreign Communication From A Counterpart Application, PCT Application No. PCT/CN2017/077366, English Translation of International Search Report dated Oct. 27, 2017, 2 pages.
Foreign Communication From A Counterpart Application, PCT Application No. PCT/CN2017/077366, English Translation of Written Opinion dated Oct. 27, 2017, 5 pages.

* cited by examiner

METHOD AND APPARATUS FOR RECOGNIZING DESCRIPTIVE ATTRIBUTE OF APPEARANCE FEATURE

CROSS-REFERENCE TO RELATED APPLICATIONS

This application is a continuation of International Patent Application No. PCT/CN2017/077366 filed on Mar. 20, 2017, which is hereby incorporated by reference in its entirety.

TECHNICAL FIELD

The present disclosure relates to the field of image processing technologies, and in particular, to a method and an apparatus for recognizing a descriptive attribute of an appearance feature.

BACKGROUND

Pedestrian attribute recognition is a pattern recognition technology that is used to recognize a descriptive attribute of an appearance feature of a pedestrian in a surveillance video. The appearance feature of the pedestrian includes a plurality of aspects such as a gender, an age, a figure, clothing, hair, an ornament, and an orientation. Each appearance feature includes a plurality of descriptive attributes. For example, when the appearance feature is a gender, descriptive attributes of the gender include male and female. For another example, when the appearance feature is hair, descriptive attributes of the hair include long hair and short hair. The appearance feature of the hair may further include other descriptive attributes. For example, descriptive attributes of the hair are distinguished based on colors, and the descriptive attributes of the hair include white, black, brown, and the like. An object of the pedestrian attribute recognition is a target image that is randomly photographed at any angle by a camera. An objective is to simplify visual information search and increase accuracy and a speed of visual information recognition by recognizing a descriptive attribute of an appearance feature of a pedestrian.

In other approaches, when a descriptive attribute of an appearance feature of an object in a target image is recognized, feature analysis and classification training are performed on the target image. Recognition of descriptive attributes of different appearance features, for example, recognition of descriptive attributes including long hair and short hair, also means performing feature analysis on the entire target image, and includes a meaningless image processing operation, increasing computer image processing workloads.

SUMMARY

The present disclosure discloses a method and an apparatus for recognizing a descriptive attribute of an appearance feature, to purposefully select, from a target image based on different appearance features, a recognition region related to a descriptive attribute of an appearance feature, thereby reducing a meaningless image processing operation and reducing computer image processing workloads.

A first aspect provides a method for recognizing a descriptive attribute of an appearance feature. The method is performed by an image processing device and includes obtaining a target image, where the target image includes an object, obtaining a location feature of an appearance feature of the target image, to determine a location of a part that is of the object in a preset object model and that is indicated by the appearance feature, where the appearance feature is used to indicate a type to which a characteristic of an appearance of the object belongs, the location feature of the appearance feature is used to indicate the location of the part that is of the object in the preset object model and that is indicated by the appearance feature, the appearance feature has a local attribute, and the local attribute is used to instruct the image processing device to process the target image in a local processing manner, recognizing a target region based on the location feature, where the target region includes the part of the object, and performing feature analysis on the target region, and recognizing a descriptive attribute of the appearance feature of the object.

The location feature of the appearance feature having the local attribute is determined. For the appearance feature having the local attribute, from the target image, the target region in which the part that is of the object and that is indicated by the appearance feature is located is purposefully selected as a recognition region for feature analysis, to reduce a meaningless recognition region, simplify an image processing operation process, reduce a time for recognizing a descriptive attribute, and reduce computer image processing workloads.

Based on the first aspect, in a first implementation, the method further includes receiving a location attribute of the appearance feature, where the location attribute is used to indicate that the appearance feature has the local attribute.

Based on the first aspect, in the first implementation, the method further includes obtaining, from a prestored correspondence between the appearance feature and a location attribute, the location attribute of the appearance feature of the object, where the location attribute is used to indicate that the appearance feature has the local attribute.

With reference to the first aspect, or the first or the second implementation of the first aspect, in a third implementation, the method further includes moving the target region in a specified direction using the target region as a center to obtain one or more offset regions, performing feature analysis on the offset region, and recognizing another descriptive attribute of the appearance feature of the object, and determining a target descriptive attribute from the descriptive attribute and the other descriptive attribute according to a preset algorithm, where the target descriptive attribute is a descriptive attribute, closest to target data, in the descriptive attribute and the other descriptive attribute. A location of the target region is adjusted in a left direction, a right direction, an upper direction, a lower direction, or another direction. For a target region that is obtained from an indistinct target image and that does not include a part of the object or includes only a section of a part of the object, an offset region that includes the part of the object may be obtained after the target region is moved. This reduces a risk that an error is relatively large in recognizing a descriptive attribute because the target region that includes only the section of the part of the object is obtained from the indistinct target image, and increases accuracy of recognizing a descriptive attribute.

With reference to the first aspect or the third implementation of the first aspect, in a fourth implementation, the method further includes extending the offset region or the target region outwards using the offset region or the target region as a center, to obtain one or more candidate regions, performing feature analysis on the candidate region, and recognizing another descriptive attribute of the appearance feature of the object, and determining a target descriptive attribute from the descriptive attribute and the other descriptive attribute according to a preset algorithm, where the target descriptive attribute is a descriptive attribute, closest to target data, in the descriptive attribute and the other descriptive attribute. The target region or the offset region is extended around for location adjustment. For a target region that is obtained from an indistinct target image and that does not include a part of the object or includes only a section of a part of the object, a candidate region that includes the part of the object may be obtained after the target region or the offset region is extended. This reduces a risk that an error is relatively large in recognizing a descriptive attribute because the target region or the offset region that includes only the section of the part of the object is obtained from the indistinct target image, and increases accuracy of recognizing a descriptive attribute.

With reference to the third or the fourth implementation of the first aspect, in a fifth implementation, moving the target region in a specified direction using the target region as a center to obtain one or more offset regions includes dividing the target region into a plurality of blocks, where the plurality of blocks are in a same shape, and the plurality of blocks are consecutive, and moving the target region one or more offset units in one or more directions using the target region as a center and using one block as an offset unit to obtain the one or more offset regions, where a size of each offset region is the same as a size of the target region, and a quantity of offset units is a positive integer.

With reference to the first aspect or any one of the first to the fifth implementations of the first aspect, in a sixth implementation, obtaining a location feature of an appearance feature includes receiving information including the location feature of the appearance feature, where the information is used to indicate the location feature of the appearance feature.

With reference to the first aspect or any one of the first to the fifth implementations of the first aspect, in a seventh implementation, obtaining a location feature of an appearance feature includes querying for a prestored correspondence between the appearance feature and the location feature, and obtaining the location feature of the appearance feature based on the appearance feature and the correspondence.

According to a second aspect, a method for recognizing a descriptive attribute of an appearance feature is provided. The method is performed by an image processing device and includes obtaining a target image, where the target image includes an object, obtaining a first location feature and a second location feature of an appearance feature of the object to determine locations of a first part and a second part that are of the object in a preset object model and that are indicated by the appearance feature, where the appearance feature is used to indicate a type to which a characteristic of an appearance of the object belongs, the first location feature is used to indicate the location of the first part that is of the object in the preset object model and that is indicated by the appearance feature, the second location feature is used to indicate the location of the second part that is of the object in the preset object model and that is indicated by the appearance feature, the appearance feature has a local attribute, and the local attribute is used to instruct the image processing device to process the target image in a local processing manner, obtaining a maximum distance between the first part and the second part based on the first location feature and the second location feature, recognizing a target region based on the maximum distance, where the target region includes the first part and the second part, and performing feature analysis on the target region, and recognizing a descriptive attribute of the appearance feature of the object in the target image.

A plurality of location features of the appearance feature having the local attribute is determined. For the appearance feature having the local attribute, from the target image, the target region in which a plurality of parts of the object that are indicated by the appearance feature are located is purposefully selected as a recognition region for feature analysis to reduce a meaningless recognition region, simplify an image processing operation process, reduce a time for recognizing a descriptive attribute, and reduce computer image processing workloads.

Based on the second aspect, in a first implementation, the maximum distance is less than a preset threshold. The preset threshold is used to instruct the image processing device to perform local processing or global processing on the target image. If the maximum distance is less than the preset threshold, the image processing device is instructed to perform local processing on the target image, or if the maximum distance is greater than or equal to the preset threshold, the image processing device is instructed to perform global processing on the target image. The global processing is processing the target image.

With reference to the second aspect or the first implementation of the second aspect, in a second implementation, the method further includes receiving a location attribute of the appearance feature, where the location attribute is used to indicate that the appearance feature has the local attribute.

With reference to the second aspect or the first implementation of the second aspect, in a third implementation, the method further includes obtaining, from a prestored correspondence between the appearance feature and a location attribute, the location attribute of the appearance feature of the object, where the location attribute is used to indicate that the appearance feature has the local attribute.

With reference to the second aspect or any one of the first to the third implementations of the second aspect, in a fourth implementation, obtaining a first location feature and a second location feature of an appearance feature of the object includes receiving information including the first location feature and the second location feature of the appearance feature, where the information is used to indicate the first location feature and the second location feature of the appearance feature.

With reference to the second aspect or any one of the first to the third implementations of the second aspect, in a fifth implementation, obtaining a first location feature and a second location feature of an appearance feature of the object includes querying for a prestored correspondence between the appearance feature and each of the first location feature and the second location feature, and obtaining the first location feature and the second location feature of the appearance feature based on the appearance feature and the correspondence.

With reference to the second aspect or any one of the first to the fifth implementations of the second aspect, in a sixth implementation, the method further includes moving the target region in a specified direction using the target region as a center, to obtain one or more offset regions, performing feature analysis on the offset region, and recognizing another descriptive attribute of the appearance feature of the object, and determining a target descriptive attribute from the descriptive attribute and the other descriptive attribute according to a preset algorithm, where the target descriptive attribute is a descriptive attribute, closest to target data, in the descriptive attribute and the other descriptive attribute. A location of the target region is adjusted in a left direction, a right direction, an upper direction, a lower direction, or another direction. For a target region that is obtained from an indistinct target image and that does not include a part of the object or includes only a section of a part of the object, an offset region that includes the part of the object may be obtained after the target region is moved. This reduces a risk that an error is relatively large in recognizing a descriptive attribute because the target region that includes only the section of the part of the object is obtained from the indistinct target image, and increases accuracy of recognizing a descriptive attribute.

With reference to the sixth implementation of the second aspect, in a seventh implementation, the method further includes extending the offset region or the target region outwards using the offset region or the target region as a center to obtain one or more candidate regions, performing feature analysis on the candidate region, and recognizing another descriptive attribute of the appearance feature of the object, and determining a target descriptive attribute from the descriptive attribute and the other descriptive attribute according to a preset algorithm, where the target descriptive attribute is a descriptive attribute, closest to target data, in the descriptive attribute and the other descriptive attribute. The target region or the offset region is extended around for location adjustment. For a target region that is obtained from an indistinct target image and that does not include a part of the object or includes only a section of a part of the object, a candidate region that includes the part of the object may be obtained after the target region or the offset region is extended. This reduces a risk that an error is relatively large in recognizing a descriptive attribute because the target region or the offset region that includes only the section of the part of the object is obtained from the indistinct target image, and increases accuracy of recognizing a descriptive attribute.

With reference to the sixth or the seventh implementation of the second aspect, in an eighth implementation, the moving the target region in a specified direction using the target region as a center to obtain one or more offset regions includes dividing the target region into a plurality of blocks, where the plurality of blocks are in a same shape, and the plurality of blocks are consecutive, and moving the target region one or more offset units in one or more directions using the target region as a center and using one block as an offset unit, to obtain the one or more offset regions, where a size of each offset region is the same as a size of the target region, and a quantity of offset units is a positive integer.

According to a third aspect, a method for recognizing a descriptive attribute of an appearance feature is provided. The method is performed by an image processing device, and includes the following steps of obtaining a target image, where the target image includes an object, and performing feature analysis on the target image, and recognizing a descriptive attribute of an appearance feature of the object in the target image, where the appearance feature is used to indicate a type to which a characteristic of an appearance of the object belongs, the descriptive attribute is used to identify the characteristic of the appearance of the object, the appearance feature has a global attribute, and the global attribute is used to indicate that a manner of processing the target image is global processing.

That the appearance feature has the global attribute is determined. For the appearance feature having the global attribute, the target image is directly selected as a recognition region for feature analysis, while block feature analysis does not need to be performed on the target image. This simplifies an image processing operation process, reduces a time for recognizing the descriptive attribute, and reduces computer image processing workloads.

With reference to the third aspect, in a first implementation, the method further includes receiving a location attribute of the appearance feature, where the location attribute is used to indicate that the appearance feature has the global attribute.

With reference to the third aspect, in a second implementation, the method further includes obtaining, from a prestored correspondence between the appearance feature and a location attribute, the location attribute of the appearance feature of the object, where the location attribute is used to indicate that the appearance feature has the global attribute.

With reference to the third aspect or the first or the second implementation of the third aspect, in a third implementation, the method further includes obtaining another appearance feature associated with the appearance feature, where the other appearance feature is used to indicate a type to which another characteristic that is of the appearance of the object and that is associated with the characteristic of the appearance feature belongs, obtaining a descriptive attribute of the other appearance feature, and modifying the descriptive attribute of the appearance feature using the descriptive attribute of the other appearance feature. The descriptive attribute of the appearance feature having the global attribute is modified using the descriptive attribute of the other appearance feature that has a local attribute and that is associated with the appearance feature having the global attribute to increase accuracy of recognizing the descriptive attribute of the appearance feature having the global attribute.

With reference to the third implementation of the third aspect, in a fourth implementation, obtaining another appearance feature associated with the appearance feature includes querying for a prestored correspondence between the appearance feature and the other appearance feature, and obtaining the other appearance feature associated with the appearance feature.

With reference to the third implementation of the third aspect, in a fifth implementation, obtaining another appearance feature associated with the appearance feature includes receiving information including an identifier of the other appearance feature, and obtaining the other appearance feature associated with the appearance feature.

With reference to any one of the third to the fifth implementations of the third aspect, in a sixth implementation, obtaining a descriptive attribute of the other appearance feature includes obtaining a location feature of the other appearance feature, where the other appearance feature is used to indicate the type to which the other characteristic of the appearance of the object belongs, the location feature of the other appearance feature is used to indicate a location of a part that is of the object in a preset object model and that is indicated by the other appearance feature, the other appearance feature has a local attribute, and the local attribute is used to instruct the image processing device to process the target image in a local processing manner, recognizing a target region based on the location feature of the other appearance feature, where the target region includes the part of the object, and performing feature analysis on the target region, and recognizing the descriptive attribute of the other appearance feature of the object.

With reference to the sixth implementation of the third aspect, in a seventh implementation, the method further includes receiving a location attribute of the appearance feature, where the location attribute is used to indicate that the other appearance feature has the local attribute.

With reference to the sixth implementation of the third aspect, in an eighth implementation, the method further includes obtaining, from a prestored correspondence between the appearance feature and a location attribute, the location attribute of the other appearance feature of the object, where the location attribute is used to indicate that the other appearance feature has the local attribute.

With reference to any one of the sixth to the eighth implementations of the third aspect, in a ninth implementation, the method further includes moving the target region in a specified direction using the target region as a center to obtain one or more offset regions, performing feature analysis on the offset region, and recognizing another descriptive attribute of the appearance feature of the object, and determining, as the descriptive attribute of the other appearance feature, a target descriptive attribute from the descriptive attribute of the other appearance feature and the other descriptive attribute according to a preset algorithm, where the target descriptive attribute is a descriptive attribute, closest to target data, in the descriptive attribute of the other appearance feature and the other descriptive attribute.

With reference to the third aspect or the ninth implementation of the third aspect, in a tenth implementation, the method further includes extending the offset region or the target region outwards using the offset region or the target region as a center, to obtain one or more candidate regions, performing feature analysis on the candidate region, and recognizing another descriptive attribute of the other appearance feature of the object, and determining, as the descriptive attribute of the other appearance feature, a target descriptive attribute from the descriptive attribute and the other descriptive attribute that are of the other appearance feature according to a preset algorithm, where the target descriptive attribute is a descriptive attribute, closest to target data, in the descriptive attribute and the other descriptive attribute that are of the other appearance feature. The target region or the offset region is extended around for location adjustment. For a target region that is obtained from an indistinct target image and that does not include a part of the object or includes only a section of a part of the object, a candidate region that includes the part of the object may be obtained after the target region or the offset region is extended. This reduces a risk that an error is relatively large in recognizing a descriptive attribute of the other appearance feature because the target region or the offset region that includes only the section of the part of the object is obtained from the indistinct target image, and increases accuracy of recognizing a descriptive attribute of the other appearance feature.

With reference to the ninth or the tenth implementation of the third aspect, in an eleventh implementation, the moving the target region in a specified direction using the target region as a center to obtain one or more offset regions includes dividing the target region into a plurality of blocks, where the plurality of blocks are in a same shape, and the plurality of blocks are consecutive, and moving the target region one or more offset units in one or more directions using the target region as a center and using one block as an offset unit, to obtain the one or more offset regions, where a size of each offset region is the same as a size of the target region, and a quantity of offset units is a positive integer.

With reference to any one of the sixth to the eleventh implementations of the third aspect, in a twelfth implementation, the obtaining a location feature of the other appearance feature includes receiving information including the location feature of the other appearance feature, where the information is used to indicate the location feature of the other appearance feature.

With reference to any one of the sixth to the eleventh implementations of the third aspect, in a thirteenth implementation, obtaining a location feature of the other appearance feature includes querying for a prestored correspondence between the other appearance feature and the location feature, and obtaining the location feature of the appearance feature based on the other appearance feature and the correspondence.

A fourth aspect provides an apparatus for recognizing a descriptive attribute of an appearance feature. The apparatus includes modules that are configured to perform the method for recognizing a descriptive attribute of an appearance feature in any one of the first aspect or the possible implementations of the first aspect. The modules may be implemented using hardware, or may be implemented by hardware by executing corresponding software.

A fifth aspect provides an apparatus for recognizing a descriptive attribute of an appearance feature, where the apparatus includes a processor and a memory. The memory stores a computer instruction, and the processor is connected to the memory. The processor is configured to execute the computer instruction in the memory, to perform the method in any one of the first aspect or the possible implementations of the first aspect.

A sixth aspect provides an apparatus for recognizing a descriptive attribute of an appearance feature. The apparatus includes modules that are configured to perform the method for recognizing a descriptive attribute of an appearance feature in any one of the second aspect or the possible implementations of the second aspect. The modules may be implemented using hardware, or may be implemented by hardware by executing corresponding software.

A seventh aspect provides an apparatus for recognizing a descriptive attribute of an appearance feature, where the apparatus includes a processor and a memory. The memory stores a computer instruction, and the processor is connected to the memory. The processor is configured to execute the computer instruction in the memory, to perform the method in any one of the second aspect or the possible implementations of the second aspect.

An eighth aspect provides an apparatus for recognizing a descriptive attribute of an appearance feature. The apparatus includes modules that are configured to perform the method for recognizing a descriptive attribute of an appearance feature in any one of the third aspect or the possible implementations of the third aspect. The modules may be implemented using hardware, or may be implemented by hardware by executing corresponding software.

A ninth aspect provides an apparatus for recognizing a descriptive attribute of an appearance feature, where the apparatus includes a processor and a memory. The memory stores a computer instruction, and the processor is connected to the memory. The processor is configured to execute the computer instruction in the memory to perform the method in any one of the third aspect or the possible implementations of the third aspect.

Embodiments of the present disclosure provide the method and the apparatus for recognizing a descriptive attribute of an appearance feature. The location feature of the appearance feature of the target image is obtained, and the location of the part that is of the object in the preset object model and that is indicated by the appearance feature is determined, where the appearance feature is used to indicate the type to which the characteristic of the appearance of the object belongs, the location feature of the appearance feature is used to indicate the location of the part that is of the object in the preset object model and that is indicated by the appearance feature, the appearance feature has the local attribute, and the local attribute is used to instruct the image processing device to process the target image in a local processing manner. The target region is recognized based on the location feature, where the target region includes the part of the object. Then, feature analysis is performed on the target region, and the descriptive attribute of the appearance feature of the object is recognized. The location feature of the appearance feature having the local attribute is determined. For the appearance feature having the local attribute, from the target image, the target region in which the part that is of the object and that is indicated by the appearance feature is located is purposefully selected as a recognition region for feature analysis, to reduce a meaningless recognition region, simplify an image processing operation process, reduce a time for recognizing a descriptive attribute, and reduce computer image processing workloads.

BRIEF DESCRIPTION OF DRAWINGS

To describe the technical solutions in some of the embodiments of the present disclosure more clearly, the following briefly describes the accompanying drawings describing some of the embodiments of the present disclosure.

DESCRIPTION OF EMBODIMENTS

The following clearly describes the technical solutions in the embodiments of the present disclosure with reference to the accompanying drawings. The described embodiments are merely some but not all of the embodiments of the present disclosure.

An image processing device, apparatus, and method that are provided in the embodiments are mainly applied to the pedestrian surveillance field, and are used to recognize a pedestrian in a surveillance video and a descriptive attribute of an appearance feature of the pedestrian. The appearance feature is used to indicate a type to which a characteristic of an appearance of a person under surveillance belongs. For example, the appearance feature may be a color of hair or a length of hair of a person, or a color of skin, a height, a gender, a type of worn clothes, or a type of a carried bag of a pedestrian. Alternatively, in application in the vehicle surveillance field, an appearance feature may be a color of a vehicle, a vehicle license plate, or a facial feature, a style of worn clothes, or a gender of a driver of a vehicle, or the like. The descriptive attribute is used to identify a characteristic of an appearance of the person. For example, the appearance feature is a color of skin of a pedestrian. The color of skin includes a plurality of descriptive attributes yellow, black, and white.

Figure 1:
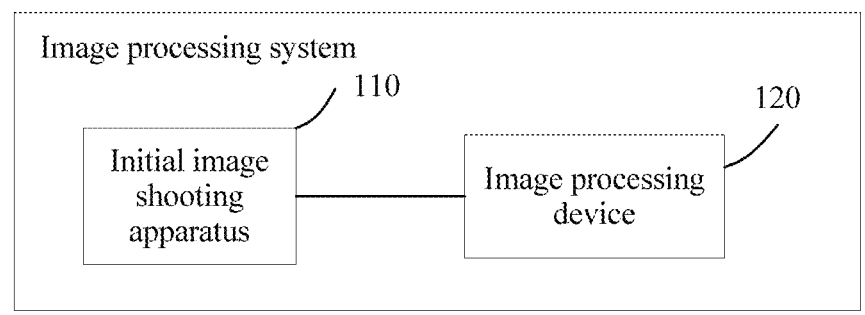
FIG. 1 is a composition diagram of an image processing system according to an embodiment of the present disclosure.

A method and an apparatus for recognizing a descriptive attribute of an appearance feature provided in the embodiments are applied to an image processing system. FIG. 1 is a composition diagram of an image processing system according to an embodiment of the present disclosure. As shown in FIG. 1, the image processing system includes an initial image shooting apparatus 110 and an image processing device 120. The initial image shooting apparatus 110 is communicatively connected to the image processing device 120. The initial image shooting apparatus 110 is configured to monitor and obtain an initial image at different shooting angles, where the initial image includes an object. The initial image shooting apparatus 110 sends the initial image to the image processing device 120. After receiving the initial image, the image processing device 120 recognizes an outline of the object in the initial image, and obtains an outline image formed by the outline. The outline image includes the object.

After obtaining the outline image, the image processing device 120 obtains a target image that includes the object in the outline image. A manner of obtaining the target image that includes the object in the outline image is that the image processing device 120 rotates an angle of the outline image on a plane based on an angle of the object in a preset object model, where an angle of the object in the outline image obtained after the angle rotation is the same as the angle of the object in the preset object model, and the object in the outline image and the object in the preset object model belong to a same type of object. For example, if the object in the initial image is a pedestrian, the preset object model is a preset human body model, an upright human body model. For example, if the object in the initial image is a vehicle, the preset object model is a preset vehicle model. Another manner of obtaining the target image that includes the object in the outline image is that the image processing device 120 receives the target image entered by a user, where the target image is a target image obtained after the user rotates the outline image using a terminal device, and the terminal device may be the image processing device 120 provided in this embodiment. The image processing device 120 may be used as the terminal device, and is configured to receive an instruction entered by the user, and rotate the outline image to obtain the target image.

After obtaining the target image, the image processing device 120 determines whether a location attribute of the appearance feature is a global attribute or a local attribute. The local attribute is used to instruct the image processing device 120 to process the target image in a local processing manner, and the global attribute is used to instruct the image processing device 120 to process the target image in a global processing manner.

If the location attribute of the appearance feature is the local attribute, the image processing device 120 recognizes a target region that matches a location feature of the appearance feature, performs feature analysis on the target region, and recognizes a descriptive attribute of the appearance feature of the object. The target region includes a part of the object.

If the location attribute of the appearance feature is the global attribute, the image processing device 120 performs feature analysis on the target image, and recognizes a descriptive attribute of the appearance feature of the object in the target image.

The initial image shooting apparatus 110 provided in this embodiment is a desktop computer, a server, a mobile computer, a mobile photographing device, a handheld terminal device, a wearable photographing device, or the like that has a function of obtaining an image through image shooting, photographing, or the like.

The image processing device 120 provided in this embodiment is a desktop computer, a server, a mobile computer, a handheld terminal device, or the like.

Figure 2:
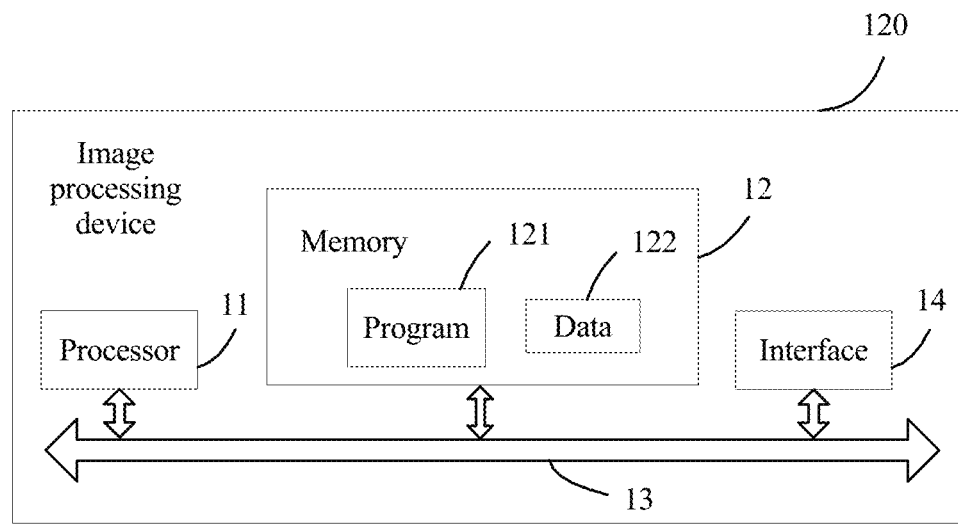
FIG. 2 is a structural diagram of an image processing device according to an embodiment of the present disclosure.

FIG. 2 is a structural diagram of an image processing device 120 according to an embodiment of the present disclosure. As shown in FIG. 2, the image processing device 120 provided in this embodiment is a computer, and includes a processor 11, a memory 12, a communications bus 13, and an interface 14. The processor 11 communicates with the memory 12 using the communications bus 13.

The interface 14 is configured to communicate with a terminal device. Data 122 and information that are sent by the terminal device may be received using the interface 14. The data 122 includes a target image.

The memory 12 is configured to store a program 121. The program 121 is used to recognize a descriptive attribute of an appearance feature of an object. The program 121 includes a program of an image processing function. The image processing function is a function of using an image processing model to output a result that is of recognizing a descriptive attribute and that is represented in a probability form. The image processing model may be a mathematical model used to process an image, for example, a convolutional neural network.

The memory 12 is further configured to store the data 122, and information that is sent using the interface 14.

The memory 12 includes a volatile memory, a non-volatile memory, or a combination thereof. The volatile memory is, for example, a random-access memory (RAM). The non-volatile memory is any machine-readable medium that can store program code, such as a floppy disk, a hard disk, a solid state disk (SSD), or an optical disc.

The processor 11 is configured to execute the program 121 to recognize the descriptive attribute of the appearance feature. The processor 11 is configured to determine whether a location attribute of the appearance feature is a global attribute or a local attribute. If the location attribute is the local attribute, the processor 11 recognizes a target region that matches a location feature of the appearance feature, performs feature analysis on the target region, and recognizes the descriptive attribute of the appearance feature of the object in the target image. The location feature is used to indicate a location of a part that is of the object in a preset object model and that is indicated by the appearance feature. The target region includes the part that is of the object and that is indicated by the appearance feature. If the location attribute is the global attribute, the processor 11 performs feature analysis on the target image that is received using the interface 14, and recognizes the descriptive attribute of the appearance feature of the object in the target image.

The processor 11 is one of main devices of the image processing device 120. Main functions of the processor 11 are to explain a computer instruction and process data in computer software. The processor 11 may be a central processing unit (CPU), a complex programmable logic device (CPLD), or a field-programmable gate array (FPGA).

Figure 3A:
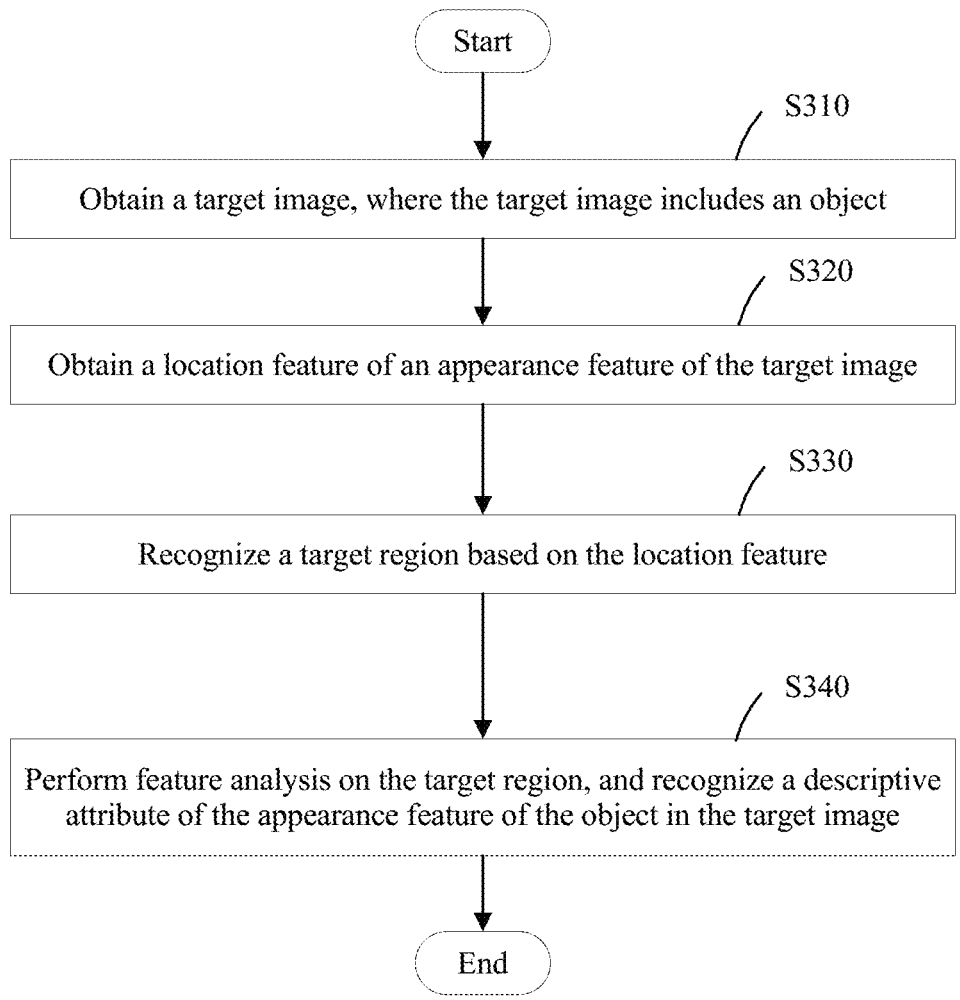
FIG. 3A is a flowchart of a method for recognizing a descriptive attribute of an appearance feature according to an embodiment of the present disclosure.

The following describes a method for recognizing a descriptive attribute of an appearance feature disclosed in the embodiments of the present disclosure. The method for recognizing a descriptive attribute of an appearance feature is applied to the image processing device 120 shown in FIG. 1 and FIG. 2, and is performed by the processor 11 in the image processing device 120. FIG. 3A is a flowchart of a method for recognizing a descriptive attribute of an appearance feature according to an embodiment of the present disclosure. As shown in FIG. 3A, this embodiment is applied to the pedestrian surveillance field, and mainly describes the method for recognizing a descriptive attribute of an appearance feature of an object if a location attribute of the appearance feature of the object is a local attribute. The method includes the following steps.

Step S310. Obtain a target image, where the target image includes an object. For details of obtaining the target image in this step, refer to the foregoing content shown in FIG. 1. After obtaining the outline image, the image processing device 120 in the image processing system obtains the target image that includes the object in the outline image. Details are not described herein again.

Step S320. Obtain a location feature of an appearance feature of the target image. The appearance feature has a local attribute, and the local attribute is used to instruct the image processing device to process the target image in a local processing manner. The location feature of the appearance feature is used to indicate a location of a part that is of the object in a preset object model and that is indicated by the appearance feature.

A manner of obtaining the location feature of the appearance feature is receiving information including the location feature of the appearance feature, and obtaining the location feature of the appearance feature, where the information is used to indicate the location feature of the appearance feature. Another manner of obtaining the location feature of the appearance feature is querying for a correspondence, prestored in the image processing device 120, between the appearance feature and the location feature, and obtaining the location feature of the appearance feature based on the appearance feature and the correspondence.

The preset object model in this embodiment is a preset human body model. The location feature of the appearance feature is used to indicate a location of a part that is of a human body in the preset human body model and that is indicated by the appearance feature. The location of the part of the human body in the preset human body model is determined in the following two manners.

In one manner, a location ratio between an outline of the part of the human body in the preset human body model and an outline of the preset human body model is determined. The location ratio may be determined by obtaining a projection relationship between the outline of the part of the human body in the preset human body model and the outline of the preset human body model, to determine the location of the part of the human body in the preset human body model, that is, to determine the location feature of the appearance feature.

In the other manner, a geometric region including the part of the human body and a location ratio between the geometric region including the part of the human body and a geometric region including the preset human body model are determined to determine the location of the part of the human body in the preset human body model, that is, to determine the location feature of the appearance feature. The geometric region including the part of the human body is a first symmetric geometric region that is formed by a height line between an uppermost point and a lowermost point of the part of the human body in the preset human body model, and a width line between a leftmost point and a rightmost point of the part of the human body in the preset human body model. The geometric region including the preset human body model is a second symmetric geometric region that is formed by a height line between an uppermost point and a lowermost point of the preset human body model, and a width line between a leftmost point and a rightmost point of the preset human body model. In this implementation, the location ratio may be determined based on a ratio between a height of the first symmetric geometric region and a height of the second symmetric geometric region, or based on a ratio between a width of the first symmetric geometric region and a width of the second symmetric geometric region. Alternatively, the location ratio is determined based on both a ratio between a height of the first symmetric geometric region and a height of the second symmetric geometric region, and a ratio between a width of the first symmetric geometric region and a width of the second symmetric geometric region. Alternatively, the location ratio is determined based on a projection relationship between the first symmetric geometric region and the second symmetric geometric region.

Step S330. Recognize a target region based on the location feature, where the target region includes the part of the object.

If the location feature of the appearance feature is determined based on the projection relationship between the outline of the part of the human body in the preset human body model and the outline of the preset human body model, in step S330, the image processing device 120 scales up or down an outline including the projection relationship, where a difference between a scaled outline including the projection relationship and the outline of the object in the target image falls within a particular error range, and then the image processing device 120 recognizes, based on the projection relationship, a target region including the part of the human body.

The following uses an example to describe a method for recognizing a target region by determining the location ratio based on the ratio between the height of the first symmetric geometric region and the height of the second symmetric geometric region.

Figure 3B:
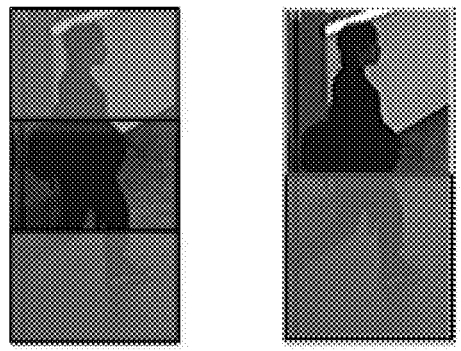
FIG. 3B is a schematic diagram of determining a target region according to an embodiment of the present disclosure.

For example, an appearance feature is hair, and a descriptive attribute of the appearance feature includes short hair and long hair. A location feature of the appearance feature of the hair is obtained by determining a location ratio of a first symmetric geometric region in an upper ½ region of a second symmetric geometric region including a preset human body model. After obtaining the location feature of the appearance feature, a target image is divided into two parts of regions an upper region and a lower region based on the location ratio of the first symmetric geometric region in the upper ½ region of the second symmetric geometric region including the preset human body model, and the upper region of the target image is selected as a target region. FIG. 3B is a schematic diagram of determining a target region according to an embodiment of the present disclosure. In a right image shown in FIG. 3B, a target image is divided into two parts of regions an upper region and a lower region, and the upper region of the target image is selected as a target region.

The location ratio of the first symmetric geometric region in the second symmetric geometric region may be indicated using a combination of coordinates of an upper left corner and coordinates of a lower right corner. For example, the location ratio of the upper ½ region is indicated using two pairs of coordinates [0, 0] and [w, h/2]. The image processing device 120 determines, based on the combination of the coordinates of the upper left corner and the coordinates of the lower right corner, that a location of the target region is the upper ½ region, of the target image, formed by the coordinates of the upper left corner and the coordinates of the lower right corner. If the location feature is obtained based on the location ratio that is determined based on the height ratio, a width of the target region may be a width w of the target image by default, and h indicates a vertical height of the target image.

The location ratio may be indicated using the combination of the coordinates of the upper left corner and the coordinates of the lower right corner, or in another manner. For example, the location of the target region is determined through calculation based on an obtained formal parameter such as "upper ½" or a "neck and head part" using a location algorithm, or determined by querying for a prestored correspondence between a formal parameter and the combination of the coordinates of the upper left corner and the coordinates of the lower right corner and obtaining the combination of coordinates of the upper left corner and the coordinates of the lower right corner.

For another example, an appearance feature is a bag, and a descriptive attribute of the appearance feature includes a backpack, a messenger bag, and a shoulder bag. A location feature of the appearance feature of the bag is obtained by determining a location ratio of a first symmetric geometric region in a middle ⅓ region of a second symmetric geometric region including a preset human body model. A target image is divided into three parts of regions an upper region, a middle region, and a lower region based on the location ratio of the first symmetric geometric region in the middle ⅓ region of the second symmetric geometric region including the preset human body model, and the middle region of the target image is selected as a target region. For example, the location ratio of the middle ⅓ region may be determined using a combination of coordinates of an upper left corner and coordinates of a lower right corner, that is, using two pairs of coordinates [0, h/3] and [w, 2h/3]. In a left image shown in FIG. 3B, the target image is divided into three parts of regions an upper region, a middle region, and a lower region, and the middle region of the target image is selected as a target region.

For still another example, an appearance feature is clothes on a lower body part, and a descriptive attribute of the appearance feature includes trousers, shorts, a miniskirt, a skirt, culottes, and the like. A location feature of the appearance feature of the clothes on a lower body part is obtained by determining that a first symmetric geometric region is in a lower ⅓ region of a second symmetric geometric region including a preset human body model. A target image is divided into three parts of regions an upper region, a middle region, and a lower region based on a location ratio of the first symmetric geometric region in the lower ⅓ region of the second symmetric geometric region including the preset human body model, and the lower region of the target image is selected as a target region.

In another implementation, the location ratio of the first symmetric geometric region in the second symmetric geometric region may be determined using a combination of a plurality pairs of coordinates.

If the location ratio is determined based on both the ratio between the height of the first symmetric geometric region and the height of the second symmetric geometric region, and the ratio between the width of the first symmetric geometric region and the width of the second symmetric geometric region, the location ratio may be determined based on coordinates of an upper left corner, coordinates of a lower left corner, coordinates of an upper right corner, and coordinates of a lower right corner, to determine the location of the target region. For example, a coordinates combination includes coordinates of an upper left corner [w/4, h/3], coordinates of a lower left corner [w/3, 2h/3], coordinates of an upper right corner [3w/4, h/3], and coordinates of a lower right corner [2w/3, 2h/3]. A target region determined using the coordinates combination is an inverted trapezoid region in the middle part of the target image. In another implementation, the location ratio of the first symmetric geometric region in the second symmetric geometric region may be determined using a combination of at least two pairs of coordinates, the coordinates of the upper left corner, the coordinates of the lower left corner, the coordinates of the upper right corner, and the coordinates of the lower right corner.

Step S340. Perform feature analysis on the target region, and recognize a descriptive attribute of the appearance feature of the object in the target image.

Feature analysis is performed on the target region using an image processing technology to obtain a recognition result that is of a descriptive attribute and that is represented in a probability form. For example, when the appearance feature is hair, there are at least two descriptive attributes of hair lengths a descriptive attribute of long hair and a descriptive attribute of short hair. In this case, an obtained recognition result that is of the descriptive attributes and that is represented in a probability form is a combination of two probabilities, that is, (0.9 for the descriptive attribute of short hair, and 0.1 for the descriptive attribute of long hair). Then, a descriptive attribute corresponding to a probability that conforms to a comprehensive determining rule is recognized according to the comprehensive determining rule, and the descriptive attribute is used as the descriptive attribute of the appearance feature of the object in the target image. The comprehensive determining rule may be after comparison or query, selecting a descriptive attribute close to target data. For example, a value of the target data is 1, and it indicates that the descriptive attribute of the appearance feature of the object is short hair. In this case, 0.9 for the descriptive attribute of short hair corresponding to a highest probability 0.9 is selected as the descriptive attribute of the appearance feature of the object in the target image.

Based on the embodiment shown in FIG. 3A, before step S320, the image processing device 120 obtains a location attribute of an appearance feature of the object, where the location attribute is used to indicate that the appearance feature has a local attribute. A method for obtaining a location attribute of an appearance feature is receiving information that includes the location attribute of the appearance feature and that is sent by a terminal device, to obtain the location attribute of the appearance feature. For example, when an appearance feature is hair, and a descriptive attribute of the hair includes long hair and short hair, information sent by a user to indicate that a location attribute of the appearance feature of the hair is the local attribute is received, and the location attribute of the hair is determined as the local attribute. For another example, when an appearance feature is a type of a bag, and a descriptive attribute of the type of a bag includes a backpack or a handbag, information sent by a user to indicate that a location attribute of the appearance feature of the type of a bag is the local attribute is received, and the location attribute of the type of a bag is determined as the local attribute. For still another example, when an appearance feature is clothes on a lower body part, and a descriptive attribute of the clothes on a lower body part includes trousers or a skirt, information sent by a user to indicate that a location attribute of the appearance feature of the clothes on a lower body part is the local attribute is received, and the location attribute of the clothes on a lower body part is determined as the local attribute.

Based on the embodiment shown in FIG. 3A, before step S320, the image processing device 120 obtains, from a prestored correspondence between the appearance feature and a location attribute, the location attribute of the appearance feature of the object, where the location attribute is used to indicate that the appearance feature has a local attribute.

Based on the embodiment shown in FIG. 3A, before step S320, the image processing device 120 obtains an appearance feature of the object and a descriptive attribute of the appearance feature. In a manner, the image processing device 120 receives, using the interface 14, an appearance feature and a descriptive attribute of the appearance feature that are entered by a user using a text. In another manner, the image processing device 120 receives an appearance feature and a descriptive attribute of the appearance feature that are entered by a user through selection on a visual interface. In still another manner, the image processing device 120 receives information that includes an appearance feature and a descriptive attribute of the appearance feature and that is sent by a terminal device, to obtain the appearance feature of the object and the descriptive attribute of the appearance feature.

Figure 3C:
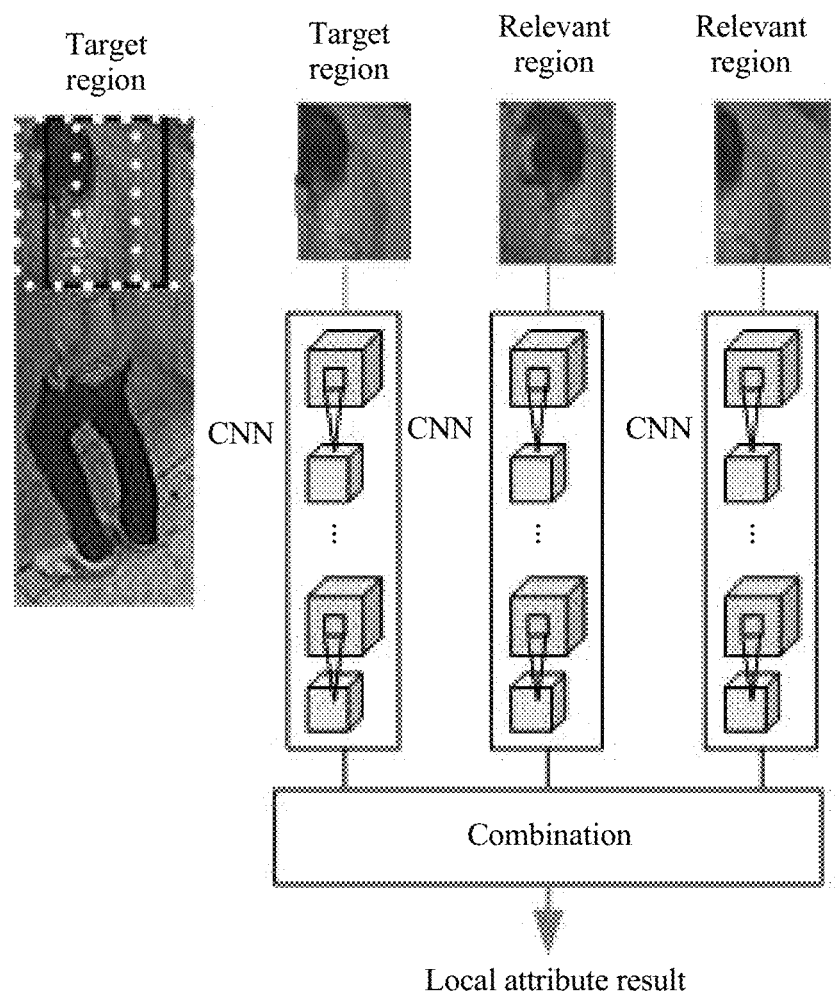
FIG. 3C is a schematic diagram obtained after movement of a target region according to an embodiment of the present disclosure.

Based on the embodiment shown in FIG. 3A, after step S330 is performed, the image processing device 120 moves, using the target region as a center, the target region in any direction, in a plurality of different specified directions, or in a plurality of random directions selected from a plurality of specified directions, to obtain a plurality of offset regions. FIG. 3C is a schematic diagram obtained after movement of a target region according to an embodiment of the present disclosure. As shown in FIG. 3C, a target region formed by a solid-line box is moved leftwards and rightwards to separately obtain two offset regions (an offset region formed by a left dashed-line box and an offset region formed by a right dashed-line box in the FIG. 3C). The offset region formed by the left dashed-line box obtained after leftward movement includes an entire head part, and the target region and the offset region obtained after rightward movement each include only a section of the head part. Therefore, after the target region is moved, a more accurate recognition region can be obtained. Then, as shown in FIG. 3C, the image processing device 120 performs feature analysis on the offset regions using an image processing technology, obtains another descriptive attribute of the appearance feature, and determines a target descriptive attribute from the descriptive attribute and the other descriptive attribute according to a preset algorithm, where the target descriptive attribute is a descriptive attribute, closest to target data, in the descriptive attribute and the other descriptive attribute.

If the descriptive attribute and the other descriptive attribute are represented in a probability form, a value of the target data may be 1, and the preset algorithm is to recognize the target descriptive attribute represented using a highest probability, and use the target descriptive attribute as a descriptive attribute of the appearance feature of the object in the target image. For example, after comparison or query, a descriptive attribute represented using a highest probability may be selected as the descriptive attribute of the appearance feature of the object in the target image. For another example, a sum of probabilities is obtained by performing a summation operation on probabilities of a same descriptive attribute matching the target region and each offset region, averaging processing or support vector machine processing is performed on the sum of the probabilities, and the target descriptive attribute represented using a highest probability is selected as the descriptive attribute of the appearance feature of the object in the target image. In another implementation, the target data may be a standard parameter of a standard image, and may be a standard parameter obtained after feature analysis is performed on the standard image in different manners.

Figure 3D:
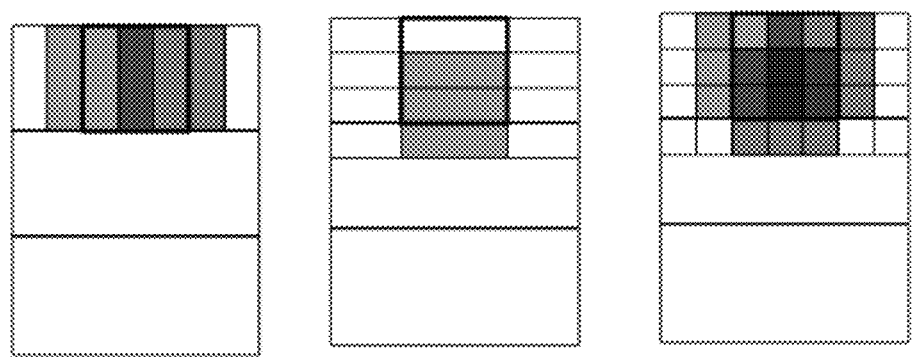
FIG. 3D is a schematic diagram of block division diagrams according to an embodiment of the present disclosure.

In the foregoing implementation of obtaining the offset region, a specific implementation of moving the target region based on the target region to obtain the one or more offset regions is dividing the target region into a plurality of blocks, where the plurality of blocks are in a same shape, and the plurality of blocks are consecutive. For example, a shape of a block may be a horizontal bar, a vertical bar, a vertical grid, or a horizontal grid. FIG. 3D is a schematic diagram of block division diagrams according to an embodiment of the present disclosure. As shown in FIG. 3D, a region formed by thick lines in each image is a target region. A block division diagram provided in this embodiment of the present disclosure may be a vertical bar-shaped block division diagram shown on the left side in FIG. 3D, may be a horizontal bar-shaped block division diagram shown in the middle in FIG. 3D, or may be a vertical or horizontal grid-shaped block division diagram shown on the right side in FIG. 3D. A shape of the block is not limited in this embodiment of the present disclosure. Then, in three images shown in FIG. 3D, the target region is moved one or more offset units in one or more directions using the target region as a center and using one block as an offset unit, to obtain the one or more offset regions, where a size of each offset region is the same as a size of the target region, and a quantity of offset units is a positive integer.

After the plurality of offset regions is obtained, the offset region or the target region is extended around according to one or more different preset sizes, to obtain a candidate region including the offset region or the target region. A size of the candidate region is greater than the size of the offset region. After the candidate region is obtained, feature analysis is performed on the candidate region using an image processing technology, another descriptive attribute of the appearance feature is obtained, and a target descriptive attribute is determined from the descriptive attribute and the other descriptive attribute according to a preset algorithm, where the target descriptive attribute is a descriptive attribute, closest to target data, in the descriptive attribute and the other descriptive attribute. The other descriptive attribute includes a descriptive attribute, of the appearance feature, that matches the candidate region and that is obtained after feature analysis is performed on the candidate region, or further includes a descriptive attribute, of the appearance feature, that matches the offset region and that is obtained after feature analysis is performed on the offset region.

If the descriptive attribute and the other descriptive attribute are represented in a probability form, a value of the target data may be 1, and the preset algorithm is to recognize the target descriptive attribute represented using a highest probability, and use the target descriptive attribute as a descriptive attribute of the appearance feature of the object in the target image. For example, after comparison or query, a descriptive attribute represented using a highest probability may be selected as the descriptive attribute of the appearance feature of the object in the target image. For example, a descriptive attribute of an appearance feature of hair includes short hair and long hair, and feature analysis is performed on a target region, an offset region, and a candidate region. In this case, that the value of the target data is 1 is used as a standard of the descriptive attribute of short hair, and feature analysis is separately performed on one target region, one offset region, and two candidate regions. Obtained probabilities of the descriptive attribute corresponding to the target region, the offset region, and the candidate regions are respectively [descriptive attribute of short hair: 0.7, descriptive attribute of long hair: 0.3], [descriptive attribute of short hair: 0.95, descriptive attribute of long hair: 0.05], [descriptive attribute of short hair: 0.6, descriptive attribute of long hair: 0.4], and [descriptive attribute of short hair: 0.45, descriptive attribute of long hair: 0.55]. A selection result is a first descriptive attribute 0.95 through a max operation. That is, the descriptive attribute of the hair is recognized as the descriptive attribute of short hair. For another example, a sum of probabilities is obtained by performing a summation operation on probabilities of a same descriptive attribute matching the target region, each offset region, and each candidate region, averaging processing or support vector machine processing is performed on the sum of the probabilities, and the target descriptive attribute represented using a highest probability is selected as the descriptive attribute of the appearance feature of the object in the target image. In another implementation, the target data may be a standard parameter of a standard image, and may be a standard parameter obtained after feature analysis is performed on the standard image in different manners.

In another embodiment, after a plurality of offset regions or a plurality of candidate regions are obtained, outline recognition may be separately performed on a part of a human body in the target region, a part of a human body in each offset region, and a part of a human body in each candidate region. When a target region, an offset region, or a candidate region that has a same outline shape as a part of a human body of the preset human body model is recognized, the target region, the offset region, or the candidate region is reserved, and feature analysis is separately performed on the target region, the offset region, or the candidate region that has the same outline shape as the part of the human body of the preset human body model, to obtain a descriptive attribute matching the reserved target region, another descriptive attribute matching each reserved offset region, and another descriptive attribute matching each reserved candidate region. After obtaining the foregoing descriptive attribute matching the target region and the plurality of other descriptive attributes matching the candidate region and the offset region, the image processing device 120 determines a target descriptive attribute from the descriptive attribute and other descriptive attributes according to the preset algorithm, where the target descriptive attribute is a descriptive attribute, closest to the target data, in the descriptive attribute and the other descriptive attributes. For the preset algorithm, refer to details described based on FIG. 3A, where after feature analysis is performed on the offset region and the candidate region, the other descriptive attribute of the appearance feature is obtained, and the target descriptive attribute is determined from the descriptive attribute and the other descriptive attribute according to the preset algorithm. Details are not described herein again.

After the plurality of offset regions is obtained, a preset quantity of offset regions may be selected randomly or according to a predetermined order for feature analysis or outline recognition of a part of the human body. After the plurality of candidate regions are obtained, a preset quantity of candidate regions may also be selected randomly or according to a predetermined order for feature analysis or outline recognition of a part of the human body. The preset quantity of selected candidate regions may be the same as or different from the preset quantity of offset regions. For example, feature analysis may be performed on only the target region depending on a user requirement, feature analysis or outline recognition may be performed on only the target region and the preset quantity of offset regions based on selection of the user, feature analysis or outline recognition may be performed on only the target region and the preset quantity of candidate regions based on user selection, or feature analysis may be performed on the target region, the preset quantity of offset regions, and the preset quantity of candidate regions. When the offset region is extended around to an edge of the target image, the obtained candidate region is the target image. That is, when it is recognized that the offset region has a same width and a same height as the target region, the obtained candidate region is the target image.

Figure 4:
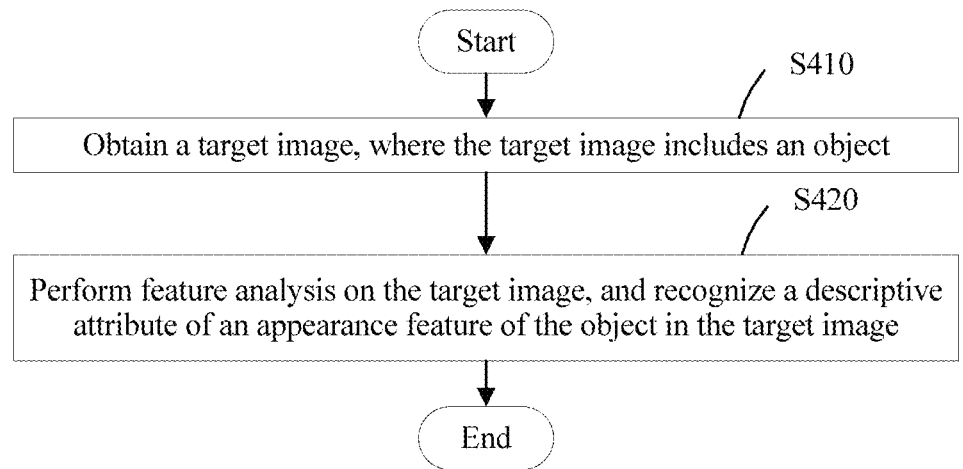
FIG. 4 is a flowchart of another method for recognizing a descriptive attribute of an appearance feature according to an embodiment of the present disclosure.

The following describes another method for recognizing a descriptive attribute of an appearance feature provided in an embodiment of the present disclosure. FIG. 4 is a flowchart of another method for recognizing a descriptive attribute of an appearance feature according to an embodiment of the present disclosure. This embodiment is applied to the pedestrian surveillance field, and mainly describes the method for recognizing a descriptive attribute of an appearance feature of an object when a location attribute of the appearance feature of the object is a global attribute. As shown in FIG. 4, the method includes the following steps.

Step S410. Obtain a target image, where the target image includes an object. For a specific implementation of obtaining the target image in this step, refer to details of step S310 in the embodiment shown in FIG. 3A. Details are not described herein again.

Step S420. Perform feature analysis on the target image, and recognize a descriptive attribute of an appearance feature of the object in the target image. The appearance feature has a global attribute, and the global attribute is used to instruct the image processing device to process the target image in a global processing manner. Feature analysis is performed on the target image using an image processing technology to obtain a recognition result that is of a descriptive attribute and that is represented in a probability form. A descriptive attribute corresponding to a probability that conforms to a comprehensive determining rule is recognized according to the comprehensive determining rule, and the descriptive attribute is used as the descriptive attribute of the appearance feature of the object in the target image. For example, after comparison or query, a descriptive attribute represented using a highest probability may be selected as the descriptive attribute of the appearance feature of the object in the target image.

Based on the foregoing method for recognizing a descriptive attribute of an appearance feature when the location attribute of the appearance feature is the global attribute, before step S420, the method further includes that the image processing device 120 obtains the location attribute of the appearance feature of the object, where the location attribute is used to indicate that the appearance feature has a global attribute. A method for obtaining a location attribute of an appearance feature is receiving information that includes the location attribute of the appearance feature and that is sent by a terminal device, to obtain the location attribute of the appearance feature.

Based on the foregoing method for recognizing a descriptive attribute of an appearance feature when the location attribute of the appearance feature is the global attribute, before step S420, the method further includes that the image processing device 120 obtains, from a prestored correspondence between the appearance feature and a location attribute, the location attribute of the appearance feature of the object, where the location attribute is used to indicate that the appearance feature has the global attribute.

In addition, before obtaining the location attribute of the appearance feature of the object, the image processing device 120 obtains the appearance feature of the object and the descriptive attribute of the appearance feature. A manner for obtaining the appearance feature of the object and the descriptive attribute of the appearance feature is that the image processing device 120 receives, using the interface 14, the appearance feature and the descriptive attribute of the appearance feature that are entered by a user using a text. Another manner for obtaining the appearance feature of the object and the descriptive attribute of the appearance feature is that the image processing device 120 receives the appearance feature and the descriptive attribute of the appearance feature that are entered by a user through selection on a visual interface. Another manner for obtaining the appearance feature of the object and the descriptive attribute of the appearance feature is that the image processing device 120 receives information that includes the appearance feature and the descriptive attribute of the appearance feature and that is sent by the terminal device to obtain the appearance feature of the object and the descriptive attribute of the appearance feature.

Based on the foregoing method for recognizing a descriptive attribute of an appearance feature when the appearance feature has the global attribute, after step S420, the method further includes obtaining another appearance feature associated with the appearance feature, where the other appearance feature is used to indicate a type to which another characteristic that is of an appearance of the object and that is associated with a characteristic of the appearance feature belongs, obtaining a descriptive attribute of the other appearance feature, and modifying the descriptive attribute of the appearance feature using the descriptive attribute of the other appearance feature.

In this embodiment, an implementation of obtaining the other appearance feature associated with the appearance feature is querying for a correspondence, prestored in the image processing device, between the appearance feature and the other appearance feature, and obtaining the other appearance feature associated with the appearance feature. Another implementation of obtaining the other appearance feature associated with the appearance feature is receiving information including an identifier of the other appearance feature, and obtaining the other appearance feature associated with the appearance feature.

For the implementation of obtaining the descriptive attribute of the other appearance feature in this embodiment, refer to the foregoing method for recognizing a descriptive attribute of an appearance feature shown in FIG. 3A when the location attribute of the appearance feature is the local attribute. Details are not described herein again.

In this embodiment, a specific implementation of modifying the descriptive attribute of the appearance feature using the descriptive attribute of the other appearance feature associated with the appearance feature is using a relevancy weighting algorithm, using, as a weight for performing weighting in the relevancy weighting algorithm, relevancy indicating an association relationship between the appearance feature and the other appearance feature, and using, as the descriptive attribute of the appearance feature of the object in the target image, a descriptive attribute obtained after weighting correction is performed on the descriptive attribute of the appearance feature. In this implementation, the other appearance feature associated with the appearance feature having the global attribute has a local attribute.

When the foregoing appearance feature has the global attribute, after step 420, the method for recognizing a descriptive attribute of an appearance feature further includes entering the target image, a target region, an offset region, or a candidate region into a mathematical model, and using, as the descriptive attribute of the appearance feature of the object in the target image, a descriptive attribute that is close to target data and that is output using the mathematical model. The mathematical model is a mathematical model obtained after training correction is performed on a computation model using a training data set. The training data set includes another image and a descriptive attribute of another appearance feature of an object in the other image, where the other image includes the target region, the offset region, or the candidate region in the target image, or another image that includes another object and that is different from the target image. The other appearance feature of the object in the other image is associated with the appearance feature that is of the target image and that has the global attribute. In this implementation, the other appearance feature of the object in the other image has a global attribute or a local attribute. The object included in the other image and the object in the target image belong to a same type of object. In this implementation, the computation model is trained using the training data set to obtain a difference between the descriptive attribute of the other appearance feature of the object in the other image and target data, a computation parameter of the computation model is adjusted based on the difference, to obtain the computation model in which the computation parameter is adjusted, and the descriptive attribute of the appearance feature of the object in the other image is recognized using the adjusted computation model, where the training correction on the computation model ends when the difference that is obtained using the computation model and that is between the descriptive attribute of the appearance feature of the object in the other image and the target data is less than or equal to a target error.

Figure 5:
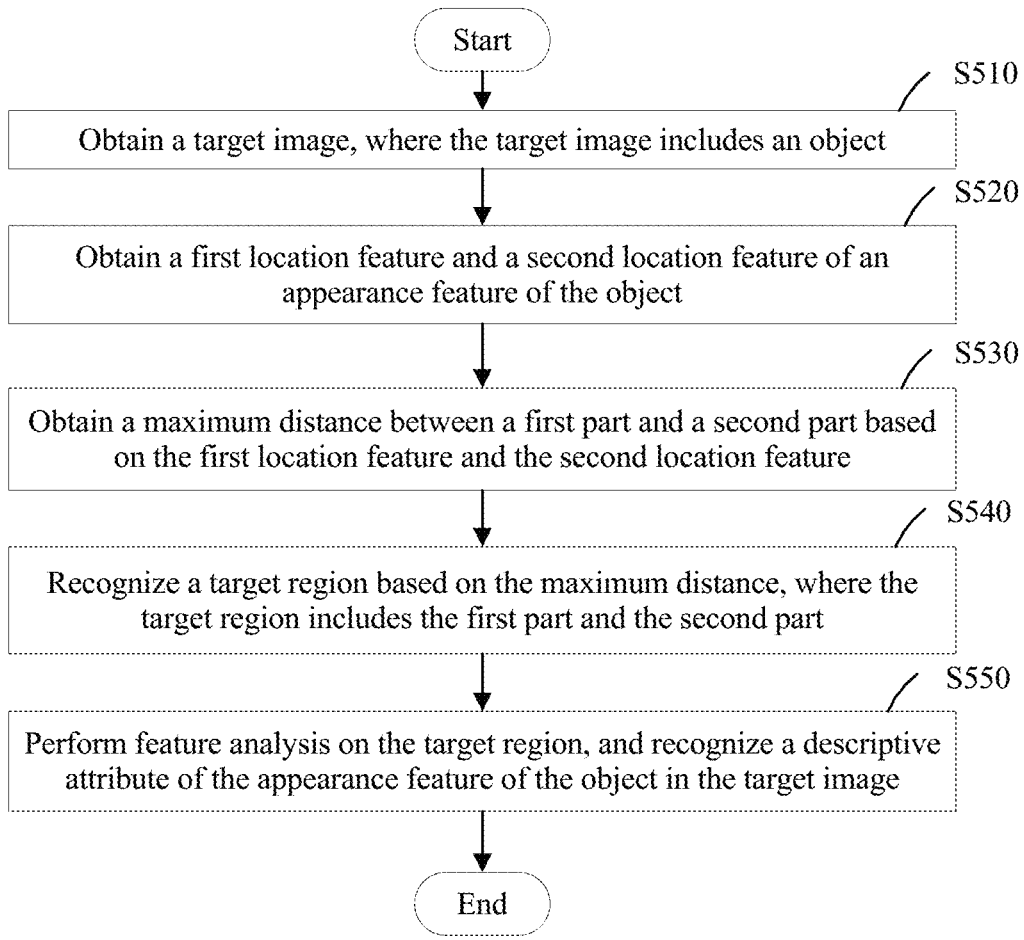
FIG. 5 is a flowchart of another method for recognizing a descriptive attribute of an appearance feature according to an embodiment of the present disclosure.

The following describes another method for recognizing a descriptive attribute of an appearance feature provided in an embodiment of the present disclosure. FIG. 5 is a flowchart of another method for recognizing a descriptive attribute of an appearance feature according to an embodiment of the present disclosure. This embodiment is applied to the pedestrian surveillance field, and mainly describes the method for recognizing a descriptive attribute of an appearance feature of an object using a plurality of location features. As shown in FIG. 5, the method includes the following steps.

Step S510. Obtain a target image, where the target image includes an object. For a specific implementation of obtaining the target image in this step, refer to details of step S310 in the embodiment shown in FIG. 3A. Details are not described herein again.

Step S520. Obtain a first location feature and a second location feature of an appearance feature of the object. Alternatively, a plurality of location features of the appearance feature of the object may be obtained, where each location feature is used to indicate a location of each part that is of the object in a preset object model and that is indicated by the appearance feature, and the appearance feature is used to indicate a type to which a characteristic of an appearance of the object belongs. For example, the first location feature is used to indicate a location of a first part that is of the object in the preset object model and that is indicated by the appearance feature, the second location feature is used to indicate a location of a second part that is of the object in the preset object model and that is indicated by the appearance feature, the appearance feature has a local attribute, and the local attribute is used to instruct the image processing device to process the target image in a local processing manner. For an implementation of obtaining the location features of the appearance feature of the object in this step, refer to details implemented in step S320 based on the embodiment shown in FIG. 3A. Details are not described herein again.

Step S530. Obtain a maximum distance between a first part and a second part based on the first location feature and the second location feature. The maximum distance is less than a preset threshold. The maximum distance includes a maximum vertical height between the two parts (the first part and the second part) and/or a maximum width between the two parts (the first part and the second part). The preset threshold is a value for ensuring that efficiency of analyzing a maximum distance is higher than efficiency of analyzing all target images. If there is a plurality of location features, the maximum distance is greater than or equal to a maximum vertical height between any two parts, or is greater than or equal to a maximum width between any two parts.

Step S540. Recognize a target region based on the maximum distance, where the target region includes the first part and the second part. If the maximum distance is the maximum vertical height between the two parts, a width of the target region is a width of the target image by default. If the maximum distance is the maximum width between the two parts, a height of the target region is a height of the target image by default. If the maximum distance includes the maximum vertical height and the maximum width between the two parts, the height of the target region is the maximum vertical height between the two parts, and the width of the target region is the maximum width between the two parts.

If there are a plurality of location features, the target region includes each part that is of the object and that is indicated by the appearance feature.

Step S550. Perform feature analysis on the target region, and recognize a descriptive attribute of the appearance feature of the object in the target image.

Based on the embodiment of recognizing a descriptive attribute of an appearance feature of an object using the plurality of location features, before step S520, the method further includes that the image processing device 120 obtains a location attribute of the appearance feature of the object, where the location attribute is used to indicate that the appearance feature has the local attribute. For a manner of obtaining the location attribute of the appearance feature in this embodiment, refer to specific implementation details of obtaining the location attribute of the appearance feature based on the embodiment shown in FIG. 3A. Details are not described herein again.

Based on the embodiment of recognizing the descriptive attribute of the appearance feature of the object using the plurality of location features, before step S520, the method further includes that the image processing device 120 obtains the appearance feature of the object and the descriptive attribute of the appearance feature. For a manner of obtaining the appearance feature of the object and the descriptive attribute of the appearance feature in this embodiment, refer to specific implementation details of obtaining the appearance feature of the object and the descriptive attribute of the appearance feature based on the embodiment shown in FIG. 3A. Details are not described herein again.

Based on the foregoing embodiment of recognizing the descriptive attribute of the appearance feature of the object using the plurality of location features, after step S540, the method further includes obtaining an offset region, and recognizing another descriptive attribute after feature analysis is performed on the offset region, and then, determining a target descriptive attribute according to a preset algorithm from the descriptive attribute recognized after feature analysis is performed on the target region, and the other descriptive attribute recognized after feature analysis is performed on the offset region. In this implementation, the offset region is obtained, and the other descriptive attribute is recognized based on the offset region, and then the target descriptive attribute is determined based on the descriptive attribute recognized based on the target region and the other descriptive attribute recognized based on the offset region. For specific implementation details, refer to specific implementation details in the embodiment shown in FIG. 3A. Details are not described herein again. In addition, a candidate region is obtained based on the offset region, and another descriptive attribute is obtained based on the candidate region, and then, a target descriptive attribute is determined based on the descriptive attribute and a plurality of other descriptive attributes. For specific implementation details, refer to specific implementation details in the embodiment shown in FIG. 3A. Details are not described herein again.

It should be understood that sequence numbers of the processes do not mean execution sequences in the embodiments of the present disclosure. The execution sequences of the processes should be determined based on functions and internal logic of the processes, and should not be construed as any limitation on the implementation processes of the embodiments of the present disclosure.

It should be noted that, for brief description, the foregoing method embodiments are represented as a series of action combinations. However, a person skilled in the art should understand that the present disclosure is not limited to the described sequence of the actions. In addition, a person skilled in the art should also understand that all the embodiments described in this specification are example embodiments, and the related actions are unnecessarily required by the present disclosure.

Another proper step combination that can be figured out by a person skilled in the art based on the foregoing content also falls within the protection scope of the present disclosure. In addition, a person skilled in the art should also understand that all the embodiments described in this specification are example embodiments, and the related actions are unnecessarily required by the present disclosure.

With reference to FIG. 3A to FIG. 5, the foregoing describes in detail the method for recognizing a descriptive attribute of an appearance feature according to the embodiments of the present disclosure. With reference to FIG. 6 to FIG. 11, the following describes an apparatus for recognizing a descriptive attribute of an appearance feature according to embodiments of the present disclosure.

Figure 6:
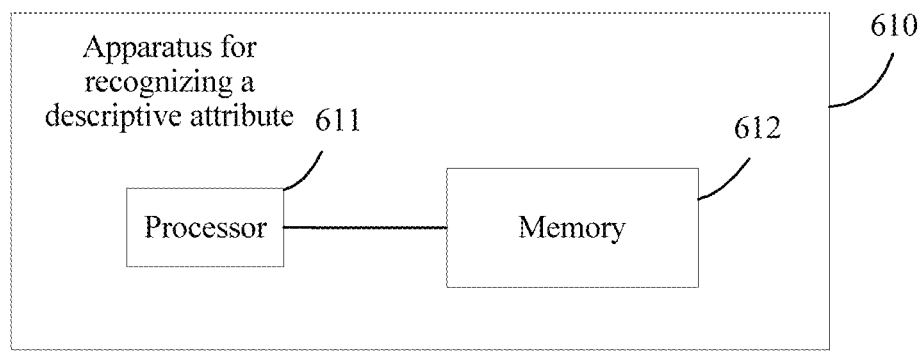
FIG. 6 is a structural diagram of an apparatus for recognizing a descriptive attribute of an appearance feature according to an embodiment of the present disclosure.

FIG. 6 is a structural diagram of an apparatus for recognizing a descriptive attribute of an appearance feature according to an embodiment of the present disclosure. As shown in FIG. 6, the apparatus 610 for recognizing a descriptive attribute of an appearance feature provided in this embodiment of the present disclosure is implemented based on the method for recognizing a descriptive attribute of an appearance feature shown in FIG. 3A. The apparatus 610 includes a processor 611 and a memory 612. The memory 612 stores a computer instruction, and the processor 611 is connected to the memory 612. The processor 611 is configured to execute the computer instruction in the memory 612 to perform the following steps.

A target image is obtained, where the target image includes an object. In this implementation, the processor 611 obtains the target image. For details, refer to the description in step S310 shown in FIG. 3A. Details are not described herein again.

A location feature of an appearance feature of the target image is obtained, where the appearance feature is used to indicate a type to which a characteristic of an appearance of the object belongs, the location feature of the appearance feature is used to indicate a location of a part that is of the object in a preset object model and that is indicated by the appearance feature, the appearance feature has a local attribute, and the local attribute is used to instruct the image processing device to process the target image in a local processing manner. In this implementation, the processor 611 obtains the location feature of the appearance feature of the target image. For details, refer to the description in step S320 shown in FIG. 3A. Details are not described herein again.

A target region is recognized based on the location feature, where the target region includes the part of the object. In this implementation, the processor 611 recognizes the target region based on the location feature. For details, refer to the description in step S330 shown in FIG. 3A. Details are not described herein again.

Feature analysis is performed on the target region, and a descriptive attribute of the appearance feature of the object is recognized. In this implementation, the processor 611 performs feature analysis on the target region, and recognizes the descriptive attribute of the appearance feature of the object. For details, refer to the description in step S330 shown in FIG. 3A. Details are not described herein again.

In an optional implementation, the processor 611 is further configured to receive a location attribute of the appearance feature, where the location attribute is used to indicate that the appearance feature has the local attribute.

In an optional implementation, the processor 611 is further configured to obtain, from a prestored correspondence between the appearance feature and a location attribute, the location attribute of the appearance feature of the object, where the location attribute is used to indicate that the appearance feature has the local attribute.

In an optional implementation, the processor 611 is further configured to perform the following steps moving the target region in a specified direction using the target region as a center, to obtain one or more offset regions, performing feature analysis on the offset region, and recognizing another descriptive attribute of the appearance feature of the object, and determining a target descriptive attribute from the descriptive attribute and the other descriptive attribute according to a preset algorithm, where the target descriptive attribute is a descriptive attribute, closest to target data, in the descriptive attribute and the other descriptive attribute.

In this implementation, the processor 611 moves the target region in the specified direction using the target region as a center to obtain the one or more offset regions, performs feature analysis on the offset region, and recognizes the other descriptive attribute of the appearance feature of the object, and determines the target descriptive attribute from the descriptive attribute and the other descriptive attribute according to the preset algorithm. For details, refer to the descriptions of related implementations after step S330 shown in FIG. 3A. Details are not described herein again.

In an optional implementation, the processor 611 is further configured to divide the target region into a plurality of blocks, where the plurality of blocks are in a same shape, and the plurality of blocks are consecutive, and move the target region one or more offset units in one or more directions using the target region as a center and using one block as an offset unit, to obtain the one or more offset regions, where a size of each offset region is the same as a size of the target region, and a quantity of offset units is a positive integer.

In an optional implementation, the processor 611 is further configured to receive information including the location feature of the appearance feature, where the information is used to indicate the location feature of the appearance feature.

In an optional implementation, the processor 611 is further configured to query for a prestored correspondence between the appearance feature and the location feature, and obtain the location feature of the appearance feature based on the appearance feature and the correspondence.

It should be understood that the apparatus 610 for recognizing a descriptive attribute of an appearance feature in this embodiment of the present disclosure may be corresponding to the image processing device 120 in the embodiments of the present disclosure, and may be corresponding to a corresponding entity for performing the method shown in FIG. 3A in the embodiments of the present disclosure. In addition, the foregoing and other operations and/or functions of the modules in the apparatus 610 for recognizing a descriptive attribute of an appearance feature are separately used to implement procedures related to the method shown in FIG. 3A. For brevity, details are not described herein again.

Figure 7:
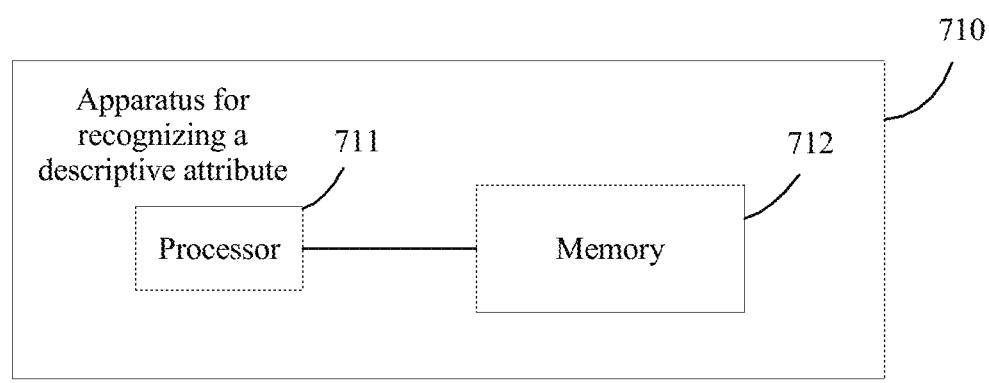
FIG. 7 is a structural diagram of another apparatus for recognizing a descriptive attribute of an appearance feature according to an embodiment of the present disclosure.

FIG. 7 is a structural diagram of another apparatus for recognizing a descriptive attribute of an appearance feature according to an embodiment of the present disclosure. As shown in FIG. 7, the apparatus 710 for recognizing a descriptive attribute of an appearance feature provided in this embodiment of the present disclosure is implemented based on the method for recognizing a descriptive attribute of an appearance feature shown in FIG. 5. The apparatus 710 includes a processor 711 and a memory 712. The memory 712 stores a computer instruction, and the processor 711 is connected to the memory 712. The processor 711 is configured to execute the computer instruction in the memory 712 to perform the following steps.

A target image is obtained, where the target image includes an object. In this implementation, the processor 711 obtains the target image. For details, refer to the description in step S310 shown in FIG. 3A. Details are not described herein again.

A first location feature and a second location feature of an appearance feature of the object are obtained, where the appearance feature is used to indicate a type to which a characteristic of an appearance of the object belongs, the first location feature is used to indicate a location of a first part that is of the object in a preset object model and that is indicated by the appearance feature, the second location feature is used to indicate a location of a second part that is of the object in the preset object model and that is indicated by the appearance feature, the appearance feature has a local attribute, and the local attribute is used to instruct the image processing device to process the target image in a local processing manner. In this implementation, the processor 711 obtains the location feature of the appearance feature of the target image. For details, refer to the description in step S320 shown in FIG. 3A. Details are not described herein again.

A maximum distance between the first part and the second part is obtained based on the first location feature and the second location feature. In this implementation, the processor 711 obtains the maximum distance between the first part and the second part based on the first location feature and the second location feature. For details, refer to the description in step S530 shown in FIG. 5. Details are not described herein again.

A target region is recognized based on the maximum distance, where the target region includes the first part and the second part. In this implementation, the processor 711 recognizes the target region based on the maximum distance. For details, refer to the description in step S540 shown in FIG. 5. Details are not described herein again.

Feature analysis is performed on the target region, and a descriptive attribute of the appearance feature of the object in the target image is recognized. In this implementation, the processor 711 performs feature analysis on the target region, and recognizes the descriptive attribute of the appearance feature of the object in the target image. For details, refer to the description in step S550 shown in FIG. 5. Details are not described herein again.

In an optional implementation, the maximum distance is less than a preset threshold.

In an optional implementation, the processor 711 is further configured to receive a location attribute of the appearance feature, where the location attribute is used to indicate that the appearance feature has the local attribute.

In an optional implementation, the processor 711 is further configured to obtain, from a prestored correspondence between the appearance feature and a location attribute, the location attribute of the appearance feature of the object, where the location attribute is used to indicate that the appearance feature has the local attribute.

In an optional implementation, the processor 711 is further configured to receive information including the first location feature and the second location feature of the appearance feature, where the information is used to indicate the first location feature and the second location feature of the appearance feature.

In an optional implementation, the processor 711 is further configured to query for a prestored correspondence between the appearance feature and each of the first location feature and the second location feature, and obtain the first location feature and the second location feature of the appearance feature based on the appearance feature and the correspondence.

In an optional implementation, the processor 711 is further configured to perform the following steps moving the target region in a specified direction using the target region as a center, to obtain one or more offset regions, performing feature analysis on the offset region, and recognizing another descriptive attribute of the appearance feature of the object, and determining a target descriptive attribute from the descriptive attribute and the other descriptive attribute according to a preset algorithm, where the target descriptive attribute is a descriptive attribute, closest to target data, in the descriptive attribute and the other descriptive attribute.

In this implementation, the processor 711 moves the target region in the specified direction using the target region as a center, to obtain the one or more offset regions, performs feature analysis on the offset region, and recognizes the other descriptive attribute of the appearance feature of the object, and determines the target descriptive attribute from the descriptive attribute and the other descriptive attribute according to the preset algorithm. For details, refer to the descriptions of related implementations after step S330 shown in FIG. 3A. Details are not described herein again.

In an optional implementation, the processor 711 is further configured to divide the target region into a plurality of blocks, where the plurality of blocks are in a same shape, and the plurality of blocks are consecutive, and move the target region one or more offset units in one or more directions using the target region as a center and using one block as an offset unit, to obtain the one or more offset regions, where a size of each offset region is the same as a size of the target region, and a quantity of offset units is a positive integer.

It should be understood that the apparatus 710 for recognizing a descriptive attribute of an appearance feature in this embodiment of the present disclosure may be corresponding to the image processing device 120 in the embodiments of the present disclosure, and may be corresponding to a corresponding entity for performing the method shown in FIG. 5 in the embodiments of the present disclosure. In addition, the foregoing and other operations and/or functions of the modules in the apparatus 710 for recognizing a descriptive attribute of an appearance feature are separately used to implement procedures related to the method shown in FIG. 5. For brevity, details are not described herein again.

Figure 8:
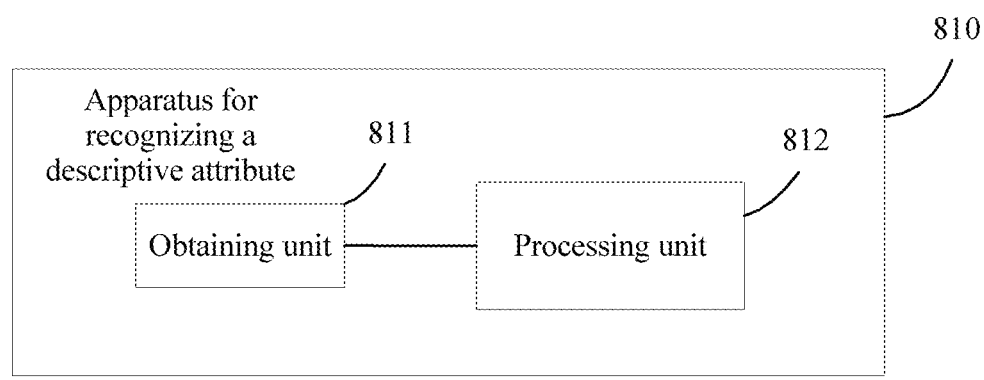
FIG. 8 is a structural diagram of another apparatus for recognizing a descriptive attribute of an appearance feature according to an embodiment of the present disclosure.

FIG. 8 is a structural diagram of another apparatus for recognizing a descriptive attribute of an appearance feature according to an embodiment of the present disclosure. As shown in FIG. 8, the apparatus 810 for recognizing a descriptive attribute of an appearance feature provided in this embodiment of the present disclosure is implemented based on the method for recognizing a descriptive attribute of an appearance feature shown in FIG. 3A. The apparatus 810 includes an obtaining unit 811 and a processing unit 812, where the processing unit 812 is connected to the obtaining unit 811. The following describes in detail a function of each module in the apparatus 810 for recognizing a descriptive attribute of an appearance feature.

The obtaining unit 811 is configured to obtain a target image, where the target image includes an object. In this implementation, a function of the obtaining unit 811 in obtaining the target image may be implemented using the interface 14 in the image processing device 120. For the function of the obtaining unit 811 in obtaining the target image, refer to specific details described in step S310 shown in FIG. 3A, where the image processing device 120 obtains the target image. Details are not described herein again.

The obtaining unit 811 is further configured to obtain a location feature of an appearance feature of the target image, where the appearance feature is used to indicate a type to which a characteristic of an appearance of the object belongs, the location feature of the appearance feature is used to indicate a location of a part that is of the object in a preset object model and that is indicated by the appearance feature, the appearance feature has a local attribute, and the local attribute is used to instruct the image processing device to process the target image in a local processing manner. In this implementation, a function of the obtaining unit 811 in obtaining the location feature of the appearance feature of the target image may be implemented using the interface 14 in the image processing device 120. For the function of the obtaining unit 811 in obtaining the location feature of the appearance feature of the target image, refer to specific details described in step S320 shown in FIG. 3A, where the image processing device 120 obtains the location feature of the appearance feature of the target image. Details are not described herein again.

The processing unit 812 is configured to recognize a target region based on the location feature, where the target region includes a part of the object. In this implementation, a function of the processing unit 812 in recognizing the target region based on the location feature may be implemented using the processor 11 in the image processing device 120. For the function of the processing unit 812 in recognizing the target region based on the location feature, refer to specific details described in step S330 shown in FIG. 3A, where the image processing device 120 recognizes the target region based on the location feature. Details are not described herein again.

The processing unit 812 is further configured to perform feature analysis on the target region, and recognize a descriptive attribute of the appearance feature of the object. In this implementation, a function of the processing unit 812 in performing feature analysis on the target region and recognizing the descriptive attribute of the appearance feature of the object may be implemented using the processor 11 in the image processing device 120. For the function of the processing unit 812 in performing feature analysis on the target region and recognizing the descriptive attribute of the appearance feature of the object, refer to specific details described in step S340 shown in FIG. 3A, where the image processing device 120 performs feature analysis on the target region, and recognizes the descriptive attribute of the appearance feature of the object. Details are not described herein again.

In an optional implementation, the obtaining unit 811 is further configured to receive a location attribute of the appearance feature, where the location attribute is used to indicate that the appearance feature has the local attribute. In this implementation, a function of the obtaining unit 811 in receiving the location attribute of the appearance feature may be implemented using the interface 14 in the image processing device 120.

In an optional implementation, the obtaining unit 811 is further configured to obtain, from a prestored correspondence between the appearance feature and a location attribute, the location attribute of the appearance feature of the object, where the location attribute is used to indicate that the appearance feature has the local attribute. In this implementation, a function of the obtaining unit 811 in obtaining, from the prestored correspondence between the appearance feature and the location attribute, the location attribute of the appearance feature of the object may be implemented using the processor 11 in the image processing device 120.

In an optional implementation, the processing unit 812 is further configured to move the target region in a specified direction using the target region as a center, to obtain one or more offset regions. In this implementation, a function of the processing unit 812 in moving the target region in a specified direction using the target region as a center, to obtain the one or more offset regions may be implemented using the processor 11 in the image processing device 120.

The processing unit 812 is further configured to perform feature analysis on the offset region, and recognize another descriptive attribute of the appearance feature of the object. In this implementation, a function of the processing unit 812 in moving the target region in a specified direction using the target region as a center, to obtain the one or more offset regions may be implemented using the processor 11 in the image processing device 120.

The processing unit 812 is further configured to determine a target descriptive attribute from the descriptive attribute and the other descriptive attribute according to a preset algorithm, where the target descriptive attribute is a descriptive attribute, closest to target data, in the descriptive attribute and the other descriptive attribute. In this implementation, a function of the processing unit 812 in determining the target descriptive attribute from the descriptive attribute and the other descriptive attribute according to the preset algorithm may be implemented using the processor 11 in the image processing device 120.

In an optional implementation, the processing unit 812 is further configured to divide the target region into a plurality of blocks. In this implementation, a function of the processing unit 812 in dividing the target region into a plurality of blocks may be implemented using the processor 11 in the image processing device 120.

The processing unit 812 is further configured to move the target region one or more offset units in one or more directions using the target region as a center and using one block as an offset unit to obtain the one or more offset regions, where a size of each offset region is the same as a size of the target region, and a quantity of offset units is a positive integer. In this implementation, a function of the processing unit 812 in moving the target region one or more offset units in one or more directions using the target region as a center and using one block as an offset unit, to obtain the one or more offset regions may be implemented using the processor 11 in the image processing device 120, where the quantity of offset units is a positive integer.

In an optional implementation, the obtaining unit 811 is further configured to receive information including the location feature of the appearance feature, where the information is used to indicate the location feature of the appearance feature. In this implementation, a function of the obtaining unit 811 in receiving the information including the location feature of the appearance feature may be implemented using the interface 14 in the image processing device 120.

In an optional implementation, the obtaining unit 811 is further configured to query for a prestored correspondence between the appearance feature and the location feature, and obtain the location feature of the appearance feature based on the appearance feature and the correspondence. In this implementation, a function of the obtaining unit 811 in querying for the prestored correspondence between the appearance feature and the location feature and obtaining the location feature of the appearance feature based on the appearance feature and the correspondence may be implemented using the processor 11 in the image processing device 120.

It should be understood that the apparatus 810 for recognizing a descriptive attribute of an appearance feature in this embodiment of the present disclosure may be implemented using an application-specific integrated circuit (ASIC) or a programmable logic device (PLD). The PLD may be a CPLD, an FPGA, a generic array logic (GAL), or any combination thereof. When the method for recognizing a descriptive attribute shown in FIG. 3A is implemented using software, the apparatus 810 for recognizing a descriptive attribute of an appearance feature and the modules of the apparatus 810 may be alternatively software modules.

The apparatus 810 for recognizing a descriptive attribute of an appearance feature in this embodiment of the present disclosure may correspondingly perform the method described in the embodiments of the present disclosure. In addition, the foregoing and other operations and/or functions of the units in the apparatus 810 for recognizing a descriptive attribute of an appearance feature are separately used to implement the method in FIG. 3A and the corresponding procedure related to the method in FIG. 3A. For brevity, details are not described herein again.

Figure 9:
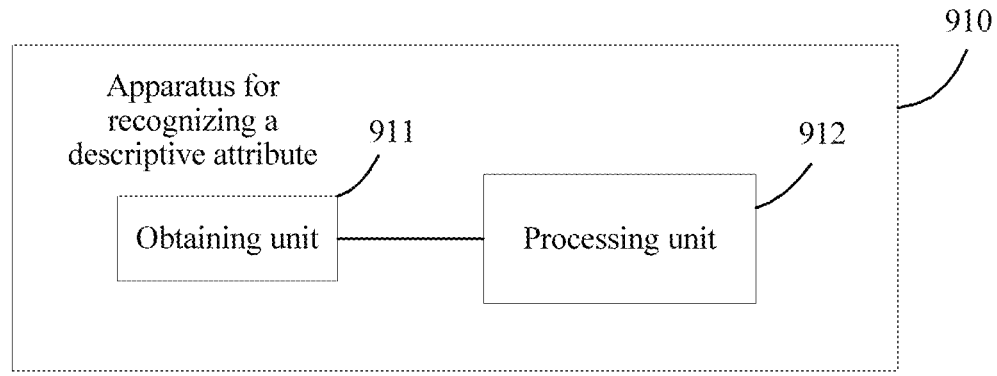
FIG. 9 is a structural diagram of another apparatus for recognizing a descriptive attribute of an appearance feature according to an embodiment of the present disclosure.

FIG. 9 is a structural diagram of another apparatus for recognizing a descriptive attribute of an appearance feature according to an embodiment of the present disclosure. As shown in FIG. 9, the apparatus 910 for recognizing a descriptive attribute of an appearance feature provided in this embodiment of the present disclosure is implemented based on the method for recognizing a descriptive attribute of an appearance feature shown in FIG. 5. The apparatus 910 includes an obtaining unit 911 and a processing unit 912, where the processing unit 912 is connected to the obtaining unit 911. The following describes in detail a function of each module in the apparatus 910 for recognizing a descriptive attribute of an appearance feature.

The obtaining unit 911 is configured to obtain a target image, where the target image includes an object. In this implementation, a function of the obtaining unit 911 in obtaining the target image may be implemented using the interface 14 in the image processing device 120. For the function of the obtaining unit 911 in obtaining the target image, refer to specific details described in step S310 shown in FIG. 3A, where the image processing device 120 obtains the target image. Details are not described herein again.

The obtaining unit 911 is further configured to obtain a first location feature and a second location feature of an appearance feature of the object, where the appearance feature is used to indicate a type to which a characteristic of an appearance of the object belongs, the first location feature is used to indicate a location of a first part that is of the object in a preset object model and that is indicated by the appearance feature, the second location feature is used to indicate a location of a second part that is of the object in the preset object model and that is indicated by the appearance feature, the appearance feature has a local attribute, and the local attribute is used to instruct the image processing device to process the target image in a local processing manner. In this implementation, a function of the obtaining unit 911 in obtaining the first location feature and the second location feature of the appearance feature of the object may be implemented using the interface 14 in the image processing device 120. For the function of the obtaining unit 911 in obtaining the first location feature and the second location feature of the appearance feature of the object, refer to specific details described in step S520 shown in FIG. 5, where the image processing device 120 obtains the first location feature and the second location feature of the appearance feature of the object. Details are not described herein again.

The processing unit 912 is configured to obtain a maximum distance between the first part and the second part based on the first location feature and the second location feature. In this implementation, a function of the processing unit 912 in obtaining the maximum distance between the first part and the second part based on the first location feature and the second location feature may be implemented using the processor 11 in the image processing device 120. For the function of the processing unit 912 in obtaining the maximum distance between the first part and the second part based on the first location feature and the second location feature, refer to specific details described in step S530 shown in FIG. 5, where the image processing device 120 obtains the maximum distance between the first part and the second part based on the first location feature and the second location feature. Details are not described herein again.

The processing unit 912 is further configured to recognize a target region based on the maximum distance, where the target region includes the first part and the second part. In this implementation, a function of the processing unit 912 in recognizing the target region based on the maximum distance may be implemented using the processor 11 in the image processing device 120. For the function of the processing unit 912 in recognizing the target region based on the maximum distance, refer to specific details described in step S540 shown in FIG. 5, where the image processing device 120 recognizes the target region based on the maximum distance. Details are not described herein again.

The processing unit 912 is further configured to perform feature analysis on the target region, and recognize a descriptive attribute of the appearance feature of the object in the target image. In this implementation, a function of the processing unit 912 in performing feature analysis on the target region and recognizing the descriptive attribute of the appearance feature of the object in the target image may be implemented using the processor 11 in the image processing device 120. For the function of the processing unit 912 in performing feature analysis on the target region and recognizing the descriptive attribute of the appearance feature of the object in the target image, refer to specific details described in step S550 shown in FIG. 5 The image processing device 120 performs feature analysis on the target region and recognizes the descriptive attribute of the appearance feature of the object in the target image. Details are not described herein again.

In an optional implementation, the maximum distance is less than a preset threshold.

In an optional implementation, the obtaining unit 911 is further configured to receive a location attribute of the appearance feature, where the location attribute is used to indicate that the appearance feature has the local attribute. In this implementation, a function of the obtaining unit 911 in receiving the location attribute of the appearance feature may be implemented using the interface 14 in the image processing device 120.

In an optional implementation, the obtaining unit 911 is further configured to obtain, from a prestored correspondence between the appearance feature and a location attribute, the location attribute of the appearance feature of the object, where the location attribute is used to indicate that the appearance feature has the local attribute. In this implementation, a function of the obtaining unit 911 in obtaining, from the prestored correspondence between the appearance feature and the location attribute, the location attribute of the appearance feature of the object may be implemented using the processor 11 in the image processing device 120.

In an optional implementation, the obtaining unit 911 is further configured to receive information including the first location feature and the second location feature of the appearance feature, where the information is used to indicate the first location feature and the second location feature of the appearance feature. In this implementation, a function of the obtaining unit 911 in receiving the information including the first location feature and the second location feature of the appearance feature may be implemented using the interface 14 in the image processing device 120.

In an optional implementation, the obtaining unit 911 is further configured to query for a prestored correspondence between the appearance feature and each of the first location feature and the second location feature, and obtain the first location feature and the second location feature of the appearance feature based on the appearance feature and the correspondence. In this implementation, a function of the obtaining unit 911 in querying for the prestored correspondence between the appearance feature and each of the first location feature and the second location feature and obtaining the first location feature and the second location feature of the appearance feature based on the appearance feature and the correspondence may be implemented using the processor 11 in the image processing device 120.

In an optional implementation, the processing unit 912 is further configured to move the target region in a specified direction using the target region as a center, to obtain one or more offset regions. In this implementation, a function of the processing unit 912 in moving the target region one or more offset units in one or more directions using the target region as a center and using one block as an offset unit, to obtain the one or more offset regions may be implemented using the processor 11 in the image processing device 120, where a quantity of offset units is a positive integer.

The processing unit 912 is further configured to perform feature analysis on the offset region, and recognize another descriptive attribute of the appearance feature of the object. In this implementation, a function of the processing unit 912 in performing feature analysis on the offset region and recognizing the other descriptive attribute of the appearance feature of the object may be implemented using the processor 11 in the image processing device 120.

The processing unit 912 is further configured to determine a target descriptive attribute from the descriptive attribute and the other descriptive attribute according to a preset algorithm, where the target descriptive attribute is a descriptive attribute, closest to target data, in the descriptive attribute and the other descriptive attribute. In this implementation, a function of the processing unit 912 in determining the target descriptive attribute from the descriptive attribute and the other descriptive attribute according to the preset algorithm may be implemented using the processor 11 in the image processing device 120.

In an optional implementation, the processing unit 912 is further configured to divide the target region into a plurality of blocks, where the plurality of blocks is in a same shape, and the plurality of blocks is consecutive. In this implementation, a function of the processing unit 912 in dividing the target region into the plurality of blocks may be implemented using the processor 11 in the image processing device 120.

The processing unit 912 is further configured to move the target region one or more offset units in one or more directions using the target region as a center and using one block as an offset unit to obtain the one or more offset regions, where a size of each offset region is the same as a size of the target region, and a quantity of offset units is a positive integer. In this implementation, a function of the processing unit 912 in moving the target region one or more offset units in one or more directions using the target region as a center and using one block as an offset unit, to obtain the one or more offset regions may be implemented using the processor 11 in the image processing device 120, where the quantity of offset units is a positive integer.

It should be understood that the apparatus 910 for recognizing a descriptive attribute of an appearance feature in this embodiment of the present disclosure may be implemented using an ASIC or a PLD. The PLD may be a CPLD, an FPGA, a GAL, or any combination thereof. When the method for recognizing a descriptive attribute shown in FIG. 5 is implemented using software, the apparatus 910 for recognizing a descriptive attribute of an appearance feature and the modules of the apparatus 910 may be alternatively software modules.

The apparatus 910 for recognizing a descriptive attribute of an appearance feature in this embodiment of the present disclosure may correspondingly perform the method described in the embodiments of the present disclosure. In addition, the foregoing and other operations and/or functions of the units in the apparatus 910 for recognizing a descriptive attribute of an appearance feature are separately used to implement the method in FIG. 5 and the corresponding procedure related to the method in FIG. 5. For brevity, details are not described herein again.

Figure 10:
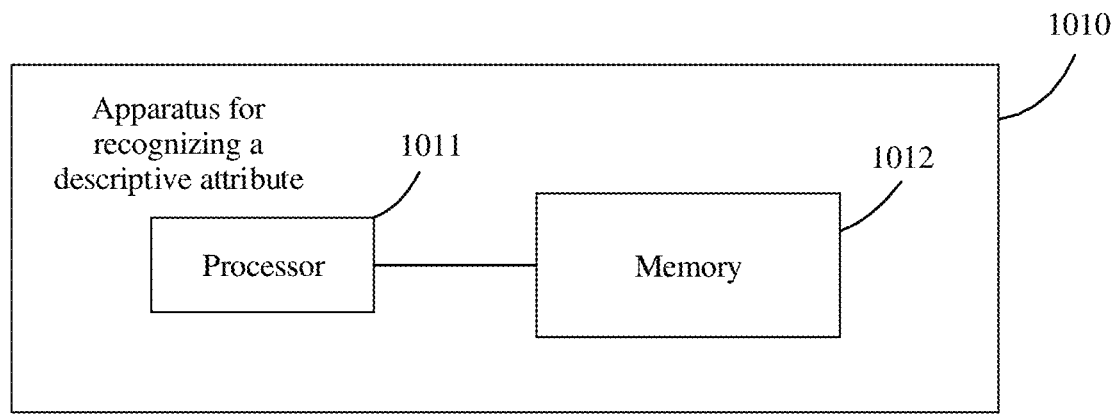
FIG. 10 is a structural diagram of another apparatus for recognizing a descriptive attribute of an appearance feature according to an embodiment of the present disclosure.

FIG. 10 is a structural diagram of another apparatus for recognizing a descriptive attribute of an appearance feature according to an embodiment of the present disclosure. As shown in FIG. 10, the apparatus 1010 for recognizing a descriptive attribute of an appearance feature provided in this embodiment of the present disclosure is implemented based on the method for recognizing a descriptive attribute of an appearance feature shown in FIG. 4. The apparatus 1010 includes a processor 1011 and a memory 1012. The memory 1012 stores a computer instruction, and the processor 1011 is connected to the memory 1012. The processor 1011 is configured to execute the computer instruction in the memory 1012 to perform the following steps.

A target image is obtained, where the target image includes an object. In this implementation, the processor 1011 obtains the target image. For details, refer to the description in step S310 shown in FIG. 3A. Details are not described herein again.

Feature analysis is performed on the target image, and a descriptive attribute of an appearance feature of the object in the target image is recognized. The appearance feature is used to indicate a type to which a characteristic of an appearance of the object belongs, the descriptive attribute is used to identify the characteristic of the appearance of the object, the appearance feature has a global attribute, and the global attribute is used to indicate that a manner of processing the target image is global processing.

In this implementation, the processor 1011 performs feature analysis on the target image, and recognizes the descriptive attribute of the appearance feature of the object in the target image. For details, refer to the description in step S420 shown in FIG. 4. Details are not described herein again.

That the appearance feature has the global attribute is determined. For the appearance feature having the global attribute, the target image is directly selected as a recognition region for feature analysis, while block feature analysis does not need to be performed on the target image. This simplifies an image processing operation process, reduces a time for recognizing the descriptive attribute, and reduces computer image processing workloads.

In an optional implementation, the processor 1011 is further configured to receive a location attribute of the appearance feature, where the location attribute is used to indicate that the appearance feature has the global attribute.

In an optional implementation, the processor 1011 is further configured to obtain, from a prestored correspondence between the appearance feature and a location attribute, the location attribute of the appearance feature of the object, where the location attribute is used to indicate that the appearance feature has the global attribute.

In an optional implementation, the processor 1011 is further configured to perform the following steps.

Another appearance feature associated with the appearance feature is obtained, where the other appearance feature is used to indicate a type to which another characteristic that is of the appearance of the object and that is associated with the characteristic of the appearance feature belongs, a descriptive attribute of the other appearance feature is obtained, and the descriptive attribute of the appearance feature is modified using the descriptive attribute of the other appearance feature. In this implementation, the processor 1011 obtains the other appearance feature associated with the appearance feature, obtains the descriptive attribute of the other appearance feature, and modifies the descriptive attribute of the appearance feature using the descriptive attribute of the other appearance feature. For details, refer to the detailed descriptions of related steps after step S420 shown in FIG. 4. Details are not described herein again.

The descriptive attribute of the appearance feature having the global attribute is modified using the descriptive attribute of the other appearance feature that has a local attribute and that is associated with the appearance feature having the global attribute, to increase accuracy of recognizing the descriptive attribute of the appearance feature having the global attribute.

In an optional implementation, the processor 1011 is further configured to perform related steps in the method for recognizing a descriptive attribute of an appearance feature shown in FIG. 4. For specific implementation details, refer to the related steps in the method for recognizing a descriptive attribute of an appearance feature shown in FIG. 4. Details are not described herein again.

It should be understood that the apparatus 1010 for recognizing a descriptive attribute of an appearance feature in this embodiment of the present disclosure may be corresponding to the image processing device 120 in the embodiments of the present disclosure, and may be corresponding to a corresponding entity for performing the method shown in FIG. 4 in the embodiments of the present disclosure. In addition, the foregoing and other operations and/or functions of the modules in the apparatus 1010 for recognizing a descriptive attribute of an appearance feature are separately used to implement procedures related to the method shown in FIG. 4. For brevity, details are not described herein again.

Figure 11:
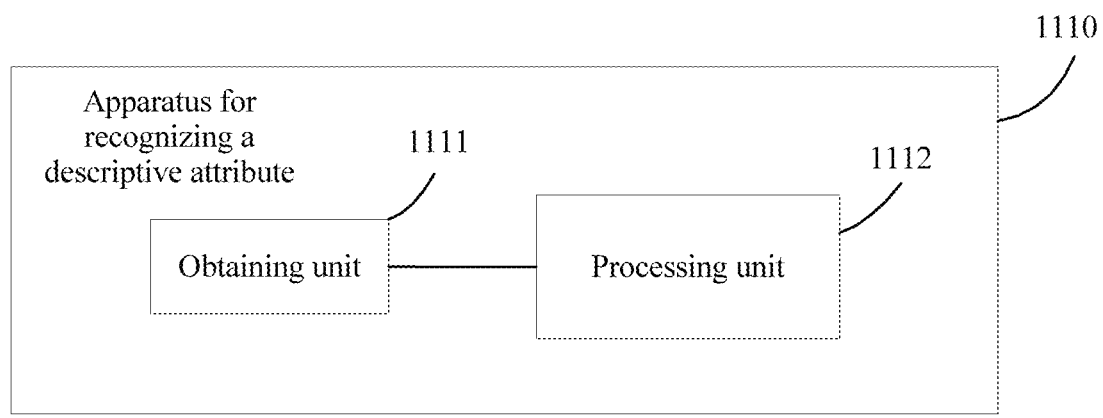
FIG. 11 is a structural diagram of another apparatus for recognizing a descriptive attribute of an appearance feature according to an embodiment of the present disclosure.

FIG. 11 is a structural diagram of another apparatus for recognizing a descriptive attribute of an appearance feature according to an embodiment of the present disclosure. As shown in FIG. 11, the apparatus 1110 for recognizing a descriptive attribute of an appearance feature provided in this embodiment of the present disclosure includes an obtaining unit 1111 and a processing unit 1112, where the processing unit 1112 is connected to the obtaining unit 1111. The following describes in detail a function of each module in the apparatus 1110 for recognizing a descriptive attribute of an appearance feature.

The obtaining unit 1111 is configured to obtain a target image, where the target image includes an object. A function of the obtaining unit 1111 in obtaining the target image may be implemented using the interface 14 in the image processing device 120. For the function of the obtaining unit 1111 in obtaining the target image, refer to specific implementation details of step S310 shown in FIG. 3A. Details are not described herein again.

The processing unit 1112 is configured to perform feature analysis on the target image, and recognize a descriptive attribute of an appearance feature of the object in the target image, where the appearance feature is used to indicate a type to which a characteristic of an appearance of the object belongs, the descriptive attribute is used to identify the characteristic of the appearance of the object, the appearance feature has a global attribute, and the global attribute is used to indicate that a manner of processing the target image is global processing. For a function of the processing unit 1112 in performing feature analysis on the target image and recognizing the descriptive attribute of the appearance feature of the object in the target image, refer to specific implementation details of step S420 shown in FIG. 4. Details are not described herein again.

That the appearance feature has the global attribute is determined. For the appearance feature having the global attribute, the target image is directly selected as a recognition region for feature analysis, while block feature analysis does not need to be performed on the target image. This simplifies an image processing operation process, reduces a time for recognizing the descriptive attribute, and reduces computer image processing workloads.

In an optional implementation, the obtaining unit 1111 is further configured to receive a location attribute of the appearance feature, where the location attribute is used to indicate that the appearance feature has the global attribute. A function of the obtaining unit 1111 in receiving the location attribute of the appearance feature may be implemented using the interface 14 in the image processing device 120.

In an optional implementation, the obtaining unit 1111 is further configured to obtain, from a prestored correspondence between the appearance feature and a location attribute, the location attribute of the appearance feature of the object, where the location attribute is used to indicate that the appearance feature has the global attribute. A function of the obtaining unit 1111 in obtaining, from the prestored correspondence between the appearance feature and the location attribute, the location attribute of the appearance feature of the object may be implemented using the processor 11 in the image processing device 120.

In an optional implementation, the obtaining unit 1111 is further configured to obtain another appearance feature associated with the appearance feature, where the other appearance feature is used to indicate a type to which another characteristic that is of the appearance of the object and that is associated with the characteristic of the appearance feature belongs. In this implementation, a function of the obtaining unit 1111 in obtaining the other appearance feature associated with the appearance feature may be implemented using the interface 14 in the image processing device 120, or implemented using the processor 11 in the image processing device 120 by querying for a prestored correspondence between the appearance feature and the other appearance feature and obtaining the other appearance feature associated with the appearance feature.

The obtaining unit 1111 is further configured to obtain a descriptive attribute of the other appearance feature. In this implementation, a function of the obtaining unit 1111 in obtaining the descriptive attribute of the other appearance feature may be implemented using the processor 11 in the image processing device.

The processing unit 1112 is further configured to modify the descriptive attribute of the appearance feature using the descriptive attribute of the other appearance feature. The descriptive attribute of the appearance feature having the global attribute is modified using the descriptive attribute of the other appearance feature that has a local attribute and that is associated with the appearance feature having the global attribute, to increase accuracy of recognizing the descriptive attribute of the appearance feature having the global attribute. In this implementation, a function of the processing unit 1112 in modifying the descriptive attribute of the appearance feature using the descriptive attribute of the other appearance feature may be implemented using the processor 11 in the image processing device.

In an optional implementation, the processing unit 1112 is further configured to implement a function by performing related steps in the method for recognizing a descriptive attribute of an appearance feature shown in FIG. 4. For specific implementation details, refer to the related steps in the method for recognizing a descriptive attribute of an appearance feature shown in FIG. 4. Details are not described herein again.

The embodiments of the present disclosure provide the method and the apparatus for recognizing a descriptive attribute of an appearance feature. The location feature of the appearance feature of the target image is obtained, and the location of the part that is of the object in the preset object model and that is indicated by the appearance feature is determined, where the appearance feature is used to indicate the type to which the characteristic of the appearance of the object belongs, the location feature of the appearance feature is used to indicate the location of the part that is of the object in the preset object model and that is indicated by the appearance feature, the appearance feature has the local attribute, and the local attribute is used to instruct the image processing device to process the target image in a local processing manner. The target region is recognized based on the location feature, where the target region includes the part of the object. Then, feature analysis is performed on the target region, and the descriptive attribute of the appearance feature of the object is recognized. The location feature of the appearance feature having the local attribute is determined. For the appearance feature having the local attribute, from the target image, the target region in which the part that is of the object and that is indicated by the appearance feature is located is purposefully selected as a recognition region for feature analysis, to reduce a meaningless recognition region, simplify an image processing operation process, reduce a time for recognizing a descriptive attribute, and reduce computer image processing workloads.

It should be understood that the apparatus 1110 for recognizing a descriptive attribute of an appearance feature in this embodiment of the present disclosure may be implemented using an ASIC or a PLD. The PLD may be a CPLD, an FPGA, a GAL, or any combination thereof. When the method for recognizing a descriptive attribute shown in FIG. 5 is implemented using software, the apparatus 1110 for recognizing a descriptive attribute of an appearance feature and the modules of the apparatus 1110 may be alternatively software modules.

The apparatus 1110 for recognizing a descriptive attribute of an appearance feature in this embodiment of the present disclosure may correspondingly perform the method described in the embodiments of the present disclosure. In addition, the foregoing and other operations and/or functions of the units in the apparatus 1110 for recognizing a descriptive attribute of an appearance feature are separately used to implement the method in FIG. 4 and the corresponding procedure related to the method in FIG. 4. For brevity, details are not described herein again.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded or executed on a computer, the procedure or functions according to the embodiments of the present disclosure are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave, or the like) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), or a semiconductor medium. The semiconductor medium may be an SSD.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art can implement the described functions using a different method for each particular application.

It may be clearly understood by a person skilled in the art that, for a convenient and brief description, for a specific working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

The foregoing descriptions are merely specific implementations of the present disclosure, but are not intended to limit the protection scope of the present disclosure. Any variation or replacement can be figured out by a person skilled in the art based on the specific implementations of the present disclosure.

What is claimed is:

1. A method performed by an image processing device, wherein the method comprises:
   obtaining a target image, wherein the target image comprises an object;
   obtaining a location feature of an appearance feature of the target image, wherein the appearance feature indicates a type to which a characteristic of an appearance of the object belongs, wherein the location feature indicates a location of a part of the object in a preset object model indicated by the appearance feature, wherein the appearance feature has a local attribute, and wherein the local attribute instructs the image processing device to process the target image in a local processing manner;
   recognizing a target region based on the location feature, wherein the target region comprises the part of the object;
   performing first feature analysis on the target region; and
   recognizing a first descriptive attribute of the appearance feature based on the first feature analysis.

2. The method of claim 1, further comprising receiving a location attribute of the appearance feature, wherein the location attribute indicates that the appearance feature has the local attribute.

3. The method of claim 1, further comprising obtaining, from a prestored correspondence between the appearance feature and a location attribute of the appearance feature, the location attribute, wherein the location attribute indicates that the appearance feature has the local attribute.

4. The method of claim 1, further comprising:
   moving the target region in a specified direction using the target region as a center to obtain one or more offset regions;
   performing second feature analysis on the one or more offset regions;
   recognizing a second descriptive attribute of the appearance feature; and
   determining a target descriptive attribute from the first descriptive attribute and the second descriptive attribute according to a preset algorithm, wherein the target descriptive attribute is the first descriptive attribute or the second descriptive attribute proximate to target data.

5. The method of claim 4, wherein moving the target region in the specified direction comprises:
dividing the target region into a plurality of blocks, wherein the blocks are in a same shape, and wherein the blocks are consecutive; and
moving the target region by one or more offset units in one or more directions using the target region as the center and one block as an offset unit to obtain the one or more offset regions, wherein a size of each offset region is the same as a size of the target region, and wherein a quantity of offset units is a positive integer.

6. The method of claim 1, wherein obtaining the location feature comprises receiving information comprising the location feature, and wherein the information indicates the location feature.

7. The method of claim 1, wherein obtaining the location feature comprises:
querying for a prestored correspondence between the appearance feature and the location feature; and
obtaining the location feature based on the appearance feature and the prestored correspondence.

8. The method of claim 1, wherein the location feature comprises a first location feature and a second location feature, wherein the first location feature indicates a first location of a first part of the object, wherein the second location feature indicates a second location of a second part of the object, wherein before recognizing the target region, the method further comprises obtaining a maximum distance between the first part and the second part based on the first location feature and the second location feature, wherein recognizing the target region comprises recognizing the target region based on the maximum distance, and wherein the target region comprises the first part and the second part.

9. An apparatus, comprising:
a memory configured to store computer instructions; and
a processor coupled to the memory and configured to execute the computer instructions to cause the apparatus to be configured to:
obtain a target image, wherein the target image comprises an object;
obtain a location feature of an appearance feature of the target image, wherein the appearance feature indicates a type to which a characteristic of an appearance of the object belongs, wherein the location feature indicates a location of a part of the object in a preset object model indicated by the appearance feature, wherein the appearance feature has a local attribute, and wherein the local attribute instructs the processor to process the target image in a local processing manner;
recognize a target region based on the location feature, wherein the target region comprises the part of the object;
perform first feature analysis on the target region; and
recognize a first descriptive attribute of the appearance feature based one the first feature analysis.

10. The apparatus of claim 9, wherein the computer instructions further cause the apparatus to be configured to receive a location attribute of the appearance feature, and wherein the location attribute indicates that the appearance feature has the local attribute.

11. The apparatus of claim 9, wherein the computer instructions further cause the apparatus to be configured to obtain, from a prestored correspondence between the appearance feature and a location attribute of the appearance feature, the location attribute, and wherein the location attribute indicates that the appearance feature has the local attribute.

12. The apparatus of claim 9, wherein the computer instructions further cause the apparatus to be configured to:
move the target region in a specified direction using the target region as a center to obtain one or more offset regions;
perform second feature analysis on the one or more offset regions;
recognize a second descriptive attribute of the appearance feature; and
determine a target descriptive attribute from the first descriptive attribute and the second descriptive attribute according to a preset algorithm, wherein the target descriptive attribute is the first descriptive attribute or the second descriptive attribute proximate to target data.

13. The apparatus of claim 12, wherein the computer instructions further cause the apparatus to be configured to:
divide the target region into a plurality of blocks, wherein the blocks are in a same shape, wherein the blocks are consecutive; and
move the target region by one or more offset units in one or more directions using the target region as the center and one block as an offset unit to obtain the one or more offset regions, wherein a size of each offset region is the same as a size of the target region, and wherein a quantity of offset units is a positive integer.

14. The apparatus of claim 9, wherein the computer instructions further cause the apparatus to be configured to receive information comprising the location feature, and wherein the information indicates the location feature.

15. The apparatus of claim 9, wherein the computer instructions further cause the apparatus to be configured to:
query for a prestored correspondence between the appearance feature and the location feature; and
obtain the location feature based on the appearance feature and the prestored correspondence.

16. The apparatus of claim 9, wherein the location feature comprises a first location feature and a second location feature, wherein the first location feature indicates a first location of a first part of the object, wherein the second location feature indicates a second location of a second part of the object, and wherein before recognizing the target region, the computer instructions further cause the apparatus to be configured to:
obtain a maximum distance between the first part and the second part based on the first location feature and the second location feature; and
recognize the target region based on the maximum distance, wherein the target region comprises the first part and the second part.

17. A computer program product comprising computer-executable instructions that are stored on a non-transitory computer-readable medium and that, when executed by a processor, cause an apparatus to:
obtain a target image, wherein the target image comprises an object;
obtain a location feature of an appearance feature of the target image, wherein the appearance feature indicates a type to which a characteristic of an appearance of the object belongs, wherein the location feature indicates a location of a part of the object in a preset object model indicated by the appearance feature, wherein the appearance feature has a local attribute, and wherein the local attribute instructs the processor to process the target image in a local processing manner;

recognize a target region based on the location feature, wherein the target region comprises the part of the object;

perform first feature analysis on the target region; and recognize a first descriptive attribute of the appearance feature based on the first feature analysis.

18. The computer program product of claim 17, wherein the computer-executable instructions further cause the apparatus to receive a location attribute of the appearance feature, and wherein the location attribute indicates that the appearance feature has the local attribute.

19. The computer program product of claim 17, wherein the computer-executable instructions further cause the apparatus to obtain, from a prestored correspondence between the appearance feature and a location attribute of the appearance feature, the location attribute, and wherein the location attribute indicates that the appearance feature has the local attribute.

20. The computer program product of claim 17, wherein the computer-executable instructions further cause the apparatus to:

move the target region in a specified direction using the target region as a center to obtain one or more offset regions;

perform second feature analysis on the one or more offset regions;

recognize a second descriptive attribute of the appearance feature; and determine a target descriptive attribute from the first descriptive attribute and the second descriptive attribute according to a preset algorithm, wherein the target descriptive attribute is the first descriptive attribute or the second descriptive attribute proximate to target data.

* * * * *